United States Patent [19]
Farmwald et al.

[11] Patent Number: 5,712,799
[45] Date of Patent: Jan. 27, 1998

[54] METHOD AND STRUCTURE FOR PERFORMING MOTION ESTIMATION USING REDUCED PRECISION PIXEL INTENSITY VALUES

[75] Inventors: P. Michael Farmwald, Portola Valley; Stephen C. Purcell, Mountain View; Andrew C. Hung, Los Altos Hills; Chad E. Fogg, Sunnyvale, all of Calif.

[73] Assignee: Chromatic Research, Inc., Sunnyvale, Calif.

[21] Appl. No.: 416,372

[22] Filed: Apr. 4, 1995

[51] Int. Cl.⁶ .................................................. H04N 7/015
[52] U.S. Cl. ........................................ 364/514 R; 348/277
[58] Field of Search ........................ 364/514 R; 382/227, 382/173; 348/277, 399, 612, 702

[56] References Cited

U.S. PATENT DOCUMENTS

| | | | |
|---|---|---|---|
| 4,396,903 | 8/1983 | Habicht et al. | 382/123 |
| 5,400,087 | 3/1995 | Uramoto et al. | 348/699 |
| 5,450,504 | 9/1995 | Calia | 382/227 |

FOREIGN PATENT DOCUMENTS

| | | |
|---|---|---|
| 0 373 291 | 6/1990 | European Pat. Off. |
| 0 661 667 | 7/1995 | European Pat. Off. |

OTHER PUBLICATIONS

Chan et al., "Motion Estimation Aarchitecture for Video Compression", IEEE Transactions on Consumer Electronics, vol. 39, No. 3, Aug. 1993, pp. 292–297, XP000396294.

Patent Abstracts of Japan vol. 12, No. 362 (E–663), 28 Sep. 1988 & JP,A,63 116584 (Matsushita Electric Ind Co Ltd), 20 May 1988.

*Primary Examiner*—James P. Trammell
*Assistant Examiner*—Thomas Peeso
*Attorney, Agent, or Firm*—Skjerven, Morrill MacPherson, Franklin & Friel; Alan H. MacPherson; E. Eric Hoffman

[57] ABSTRACT

A method of approximating the pixel intensity values of a current block using the pixel intensity values of a search window, wherein the precision of the number of bits used to represent the pixel intensity values is reduced. The pixel intensity values of the pixels in the current block are averaged to determine a first average pixel intensity value. The pixel intensity values of the current block which have a pixel intensity value less than the first average pixel intensity value are averaged to determine a second average pixel intensity value. The pixel intensity values of the current block which have a pixel intensity value greater than the first average pixel intensity value are averaged to determine a third average pixel intensity value. The first, second and third average pixel intensity values are used to determine thresholded pixel intensity values for the current block pixels and the search window pixels, thereby creating a thresholded current block and a thresholded search window.

26 Claims, 33 Drawing Sheets

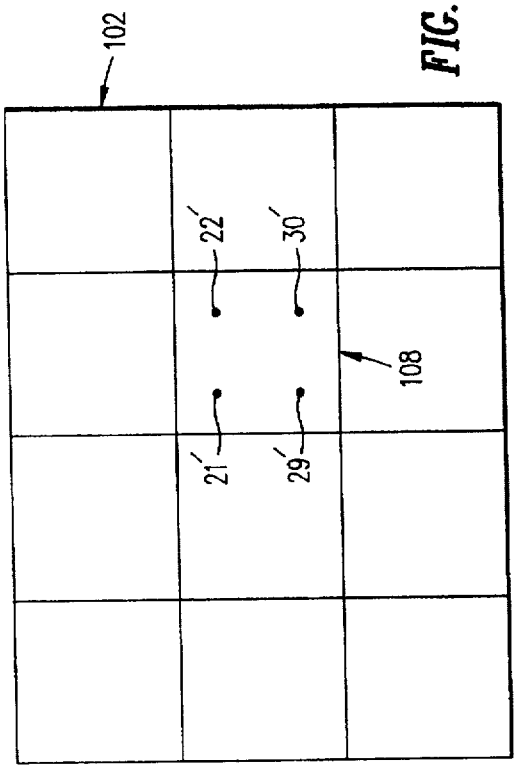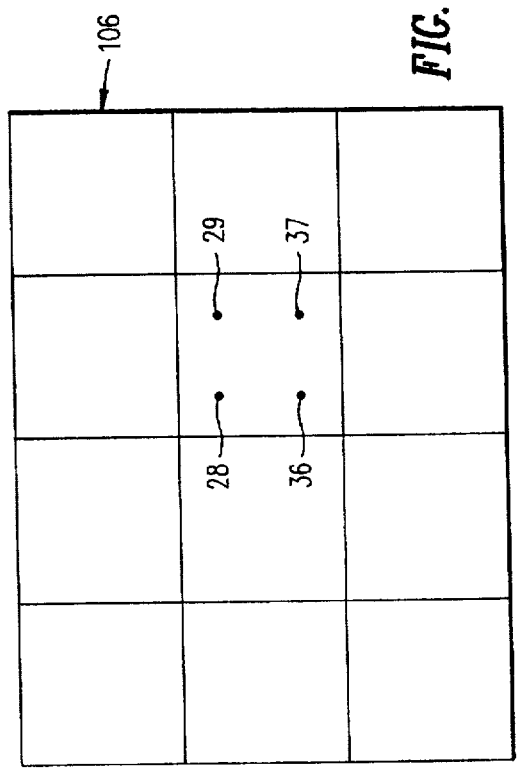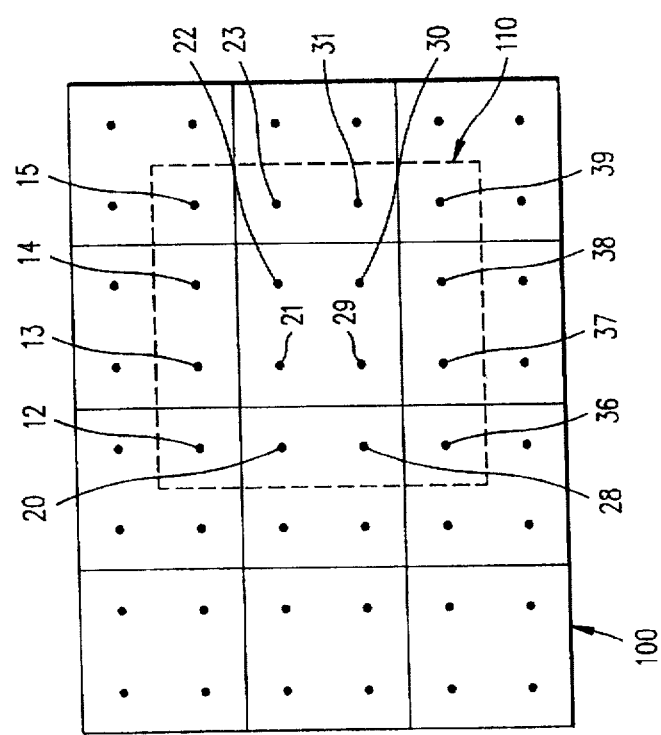

FIG. 7

| 1071-(2) | 1072-(3) | 1073-(3) | 1074-(3) |
| 1075-(2) | 1076-(3) | 1077-(3) | 1078-(3) |
| 1079-(1) | 1080-(1) | 1081-(2) | 1082-(2) |
| 1083-(0) | 1084-(0) | 1085-(1) | 1086-(1) |

| 1001-(2) | 1002-(3) | 1003-(3) | 1004-(3) | 1005-(3) | 1006-(3) | 1007-(3) | 1008-(3) |
| 1009-(2) | 1010-(3) | 1011-(3) | 1012-(3) | 1013-(3) | 1014-(3) | 1015-(3) | 1016-(3) |
| 1017-(1) | 1018-(2) | 1019-(3) | 1020-(3) | 1021-(3) | 1022-(3) | 1023-(3) | 1024-(3) |
| 1025-(0) | 1026-(1) | 1027-(2) | 1028-(2) | 1029-(3) | 1030-(3) | 1031-(3) | 1032-(3) |
| 1033-(0) | 1034-(0) | 1035-(1) | 1036-(2) | 1037-(3) | 1038-(3) | 1039-(3) | 1040-(3) |
| 1041-(0) | 1042-(0) | 1043-(1) | 1044-(1) | 1045-(1) | 1046-(2) | 1047-(2) | 1048-(2) |
| 1049-(0) | 1050-(0) | 1051-(0) | 1052-(0) | 1053-(0) | 1054-(0) | 1055-(1) | 1056-(1) |
| 1057-(0) | 1058-(0) | 1059-(0) | 1060-(0) | 1061-(0) | 1062-(0) | 1063-(1) | 1064-(1) |

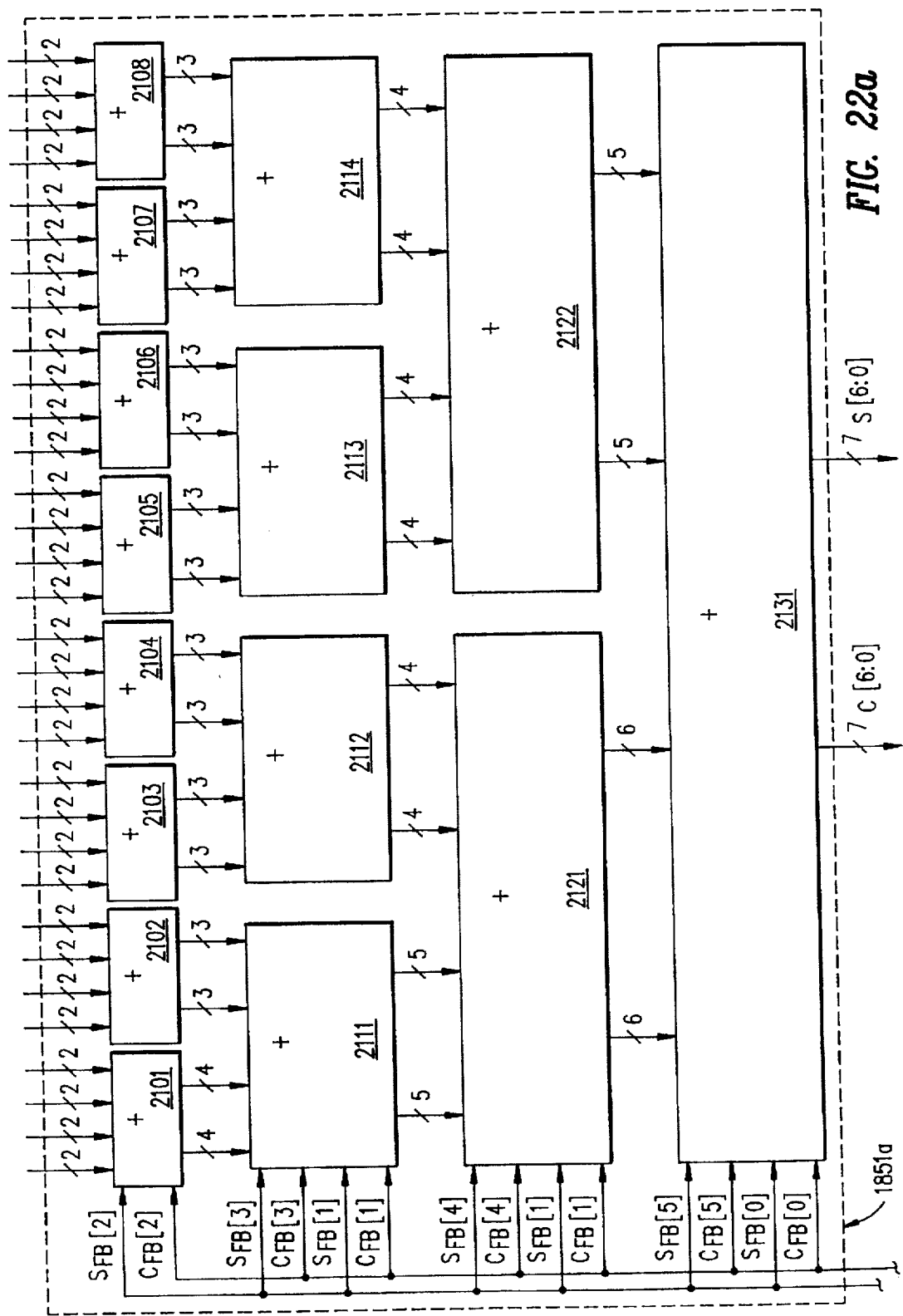

KEY TO

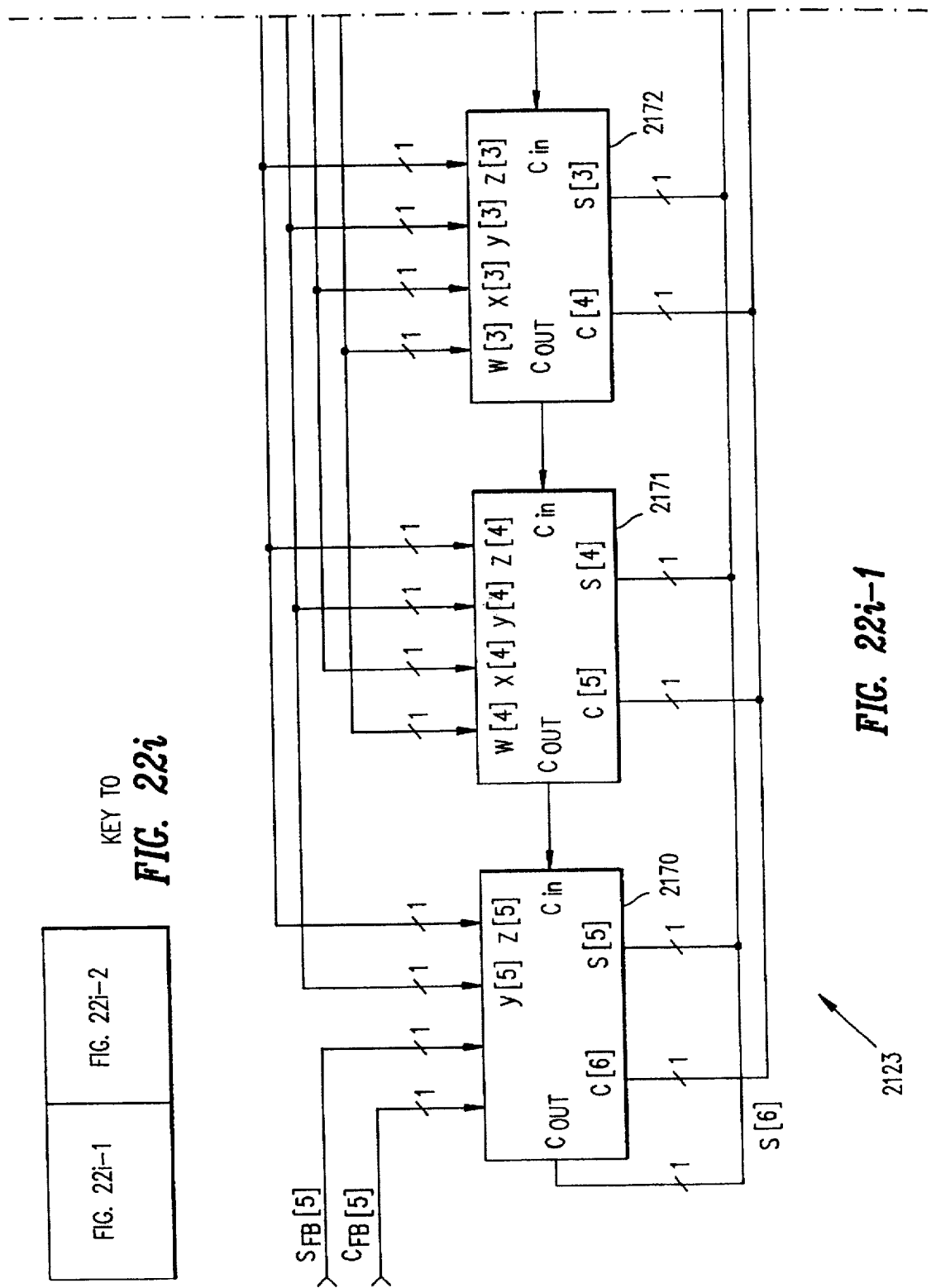

METHOD AND STRUCTURE FOR PERFORMING MOTION ESTIMATION USING REDUCED PRECISION PIXEL INTENSITY VALUES

FIELD OF THE INVENTION

The present invention relates to a method and structure for performing motion estimation in a video signal processing environment.

DESCRIPTION OF PRIOR ART

Many important video compression methods use interframe block prediction to improve compression ratios. Interframe block prediction involves using a block within a reference frame to approximate a current block within a current frame. The determination of the appropriate matching blocks in the reference frame which accurately represent the block of the current frame is extremely computationally intensive. For example, the MPEG-II standard requires computation rates approaching 10 billion operations per second to implement real time, high quality motion prediction.

Video compression methods can generally be divided into two domains: the transform domain and the spatial domain. The transform domain, also referred to as phase correlation matching, requires that a Fast Fourier Transform (FFT) be performed on both a current frame and a previous frame of video information. The results of the FFTs are then used to determine which portions of the previous frame best match portions of the current frame. Extensive hardware is required to perform the FFTs and compare the previous and current frames. For this reason, the transform domain is not typically used to compress data in video applications.

The spatial domain can further be divided into PEL recursive and block based techniques. PEL recursive techniques typically compare individual pixel values from current and previous frames to determine the best pixel values for the current frame.

FIGS. 1a–1c are schematic diagrams which illustrate various frames used in block based motion estimation techniques. Reference frame 100 (FIG. 1a) shows an 8×6 pixel frame with 2×2 pixel blocks. Reference frame 100 is initially read into a video signal processor (not shown). The size of reference frame 100 is dependent upon the video monitor being used. A typical video monitor has a frame size of 640×480 pixels. Current frame 102 (FIG. 1b) is the frame of video information which is displayed on the video monitor after reference frame 100. Current frame 102 is typically divided into a plurality of blocks such as current block 108. For purposes of illustration, current block 108 is illustrated as a 2×2 pixel block having pixels 21', 22', 29' and 30'.

In general, block based estimation approximates the pixel values of current frame 102 using the pixel values of reference frame 100 which most closely correspond to the pixel values of current frame 102. This results in an estimated current frame 106 (FIG. 1c). Because video images typically do not significantly change from frame to frame, the estimated current frame 106 will usually closely approximate current frame 102. To generate an image of current frame 102 on the video monitor, the video signal processor simply updates any differences between the estimated current frame 106 and the current frame 102. This eliminates the temporal redundancy of each new frame of video information. This also greatly reduces the amount of transmitted data to generate current frame 102.

In block based estimation, the pixels of current block 108 are compared with pixels within a corresponding search window 110 of reference frame 100 to determine a search block within the search window 110 which most closely corresponds to current block 108. For example, to determine the search block within search window 110 which most closely corresponds to current block 108, the pixel values of block 108 are compared with each of the search blocks in search window 110. Search window 110 is illustrated as a 4×4 pixel window which includes pixels 12–15, 20–23, 28–31 and 36–39. The search blocks within search window 110 include each 2×2 pixel block within search window 110. There are nine 2×2 pixel search blocks in search window 110. Comparisons are made between the pixels of current block 108 and the pixels of the search blocks of search window 110 as set forth in Table 1.

TABLE 1

| Comparison | Pixel of Block 108 | | | |
|---|---|---|---|---|
| | Pixel 21' | Pixel 22' | Pixel 29' | Pixel 30' |
| Search Block 1 | Pixel 12 | Pixel 13 | Pixel 20 | Pixel 21 |
| Search Block 2 | Pixel 13 | Pixel 14 | Pixel 21 | Pixel 22 |
| Search Block 3 | Pixel 14 | Pixel 15 | Pixel 22 | Pixel 23 |
| Search Block 4 | Pixel 20 | Pixel 21 | Pixel 28 | Pixel 29 |
| Search Block 5 | Pixel 21 | Pixel 22 | Pixel 29 | Pixel 30 |
| Search Block 6 | Pixel 22 | Pixel 23 | Pixel 30 | Pixel 31 |
| Search Block 7 | Pixel 28 | Pixel 29 | Pixel 36 | Pixel 37 |
| Search Block 8 | Pixel 29 | Pixel 30 | Pixel 37 | Pixel 38 |
| Search Block 9 | Pixel 30 | Pixel 31 | Pixel 38 | Pixel 39 |

Thus, in the comparison of search block 1 and block 108, the value of pixel 21' is subtracted from the value of pixel 12, the value of pixel 22' is subtracted from the value of pixel 13, the value of pixel 29' is subtracted from the value of pixel 20 and the value of pixel 30' is subtracted from the value of pixel 21. The absolute value of each of these differences is summed to create a mean absolute difference (unnormalized). (In another variation, the differences are squared and then summed to create a mean squared error.) The search block which results in the smallest mean absolute difference is used to estimate block 108 in the estimated current block. Therefore, if search block 7 results in the smallest mean absolute difference between the compared pixel values, the pixels of search block 7 (i.e., pixels 28, 29, 36 and 37) are used to estimate pixels 21', 22', 29' and 30', as illustrated in FIG. 1c. This process is repeated for each of the current blocks in current frame 102.

A typical block size is 16×16 pixels. Thus, when using a 640×480 pixel monitor, there are 1200 blocks per frame. A typical search window 110 is 40×40 pixels. As previously discussed, each pixel comparison requires three operations (i.e., subtraction, absolute value and addition). Thus, the calculation of each estimated current frame requires approximately 1.5 billion calculations (3 operations/pixel comparison×256 pixel comparisons/block comparison× 1600 block comparisons/search window×1200 search windows/frame).

To reduce the number of operations required to generate the estimated current frame, a number of different techniques have been developed. First, the search window may be algorithmically subsampled. That is, not every possible search block within the search window is compared with the current block of the current frame. Rather, the search blocks within the search window are selected every n pixels (where n>1).

FIGS. 2a–2c are schematic diagrams illustrating algorithmic subsampling of a 12×12 pixel search window 200. In FIGS. 2a–2c, the block size is assumed to be 4×4 pixels. In the absence of algorithmic subsampling, there would be eighty one overlapping 4×4 pixel search blocks within search window 200 to be compared with a 4×4 pixel block in the corresponding current frame. However, when using algorithmic subsampling with n=4, each search block within search window 200 is offset from the other search blocks by four pixels. As a result, there are only nine 4×4 pixel search blocks 201-209 (FIG. 2a) within search window 200 which are compared with the 4×4 pixel block of the corresponding current frame. The upper left pixels of search blocks 201-209 are located at pixel positions 211-219, respectively. The search block which results in the lowest mean absolute difference is selected as a first optimal search block within the search window 200. In the present example it is assumed that the first optimal search block is block 205.

A second set of block comparisons is then performed about the first optimal search block 205 using a smaller search window 240 (e.g., 8×8 pixels) and a greater search resolution of n/2 (e.g., 2) pixels. Thus, for the second set of search block comparisons, eight additional 4×4 pixel search blocks (not shown), which are offset from the first optimal search block 205 by two pixels, are compared with the 4×4 pixel current block of the corresponding current frame. The upper left pixels of these eight additional search blocks are aligned with pixel positions 221-228 (FIG. 2b). The search block comparison which provides the lowest mean absolute difference is selected as the second optimal search block within the search window 200. In the present example it is assumed that this second optimal search block is also block 205.

A third set of search block comparisons is then performed about the second optimal search block using a smaller search window 250 (e.g., 6×6 pixels) and a greater search resolution of n/4 (e.g., 1) pixels. Thus, for the third set of search block comparisons, eight additional 4×4 blocks (not shown), which are offset from the second optimal search block 205 by one pixel, are compared with the corresponding 4×4 pixel block of the current frame. The upper left pixels of these eight additional search blocks are aligned with pixel positions 231-238 (FIG. 2c). The search block which results in the lowest mean absolute difference is selected as the third optimal search block within the search window 200. This third optimal search block is used to estimate the corresponding 4×4 pixel block of the current frame.

Algorithmic subsampling reduces the total number of pixel comparisons performed to determine the estimated current frame. In the previously described example, the number of search window comparisons was reduced from eighty one to twenty five.

Block subsampling is another technique used to reduce the number of operations required to generate an estimated current frame. In block subsampling, rather than comparing each pixel of the current block with each pixel of the search blocks, every nth pixel of the current frame (horizontally and vertically) is compared with every nth pixel of each search block. Thus, when n=2, every second pixel of the current block is compared with every second pixel of each search block. In this manner, the number of pixels compared during each search block comparison is reduced by a factor of $n^2$. The search block comparison having the lowest mean absolute difference is used in the estimated current frame.

In another conventional technique, both the search window and the current block are hierarchically filtered. To perform the filtering function, two or more consecutive pixels are averaged to obtain average pixel values. After both the search window and current block are filtered, the comparisons between the search blocks and the current block proceed substantially as described above. Filtering avoids aliasing due to subsampling and reduces bad block matches due to the effects of high frequency noise. Filtering maintains, to a certain extent, the continuity of the pixels because pixels are averaged, rather than ignored as in the subsampling techniques.

In the previously mentioned techniques, the search window may be given different dimensions and/or aspect ratios.

All of the previously described techniques increase the speed of generating an estimated current frame by reducing the number of pixels to be compared within the search window, the current block, or both. However, all of these techniques require significant memory to store the pixel values of the search window. In addition, the hardware required to compare the pixel values (typically 8-bits long) is fairly silicon intensive. It would therefore be desirable to have a block based motion estimation technique which allows the search window to be stored using less memory than the prior art. It would also be desirable to have a technique which reduces the complexity, and therefore the layout area, of the hardware required to compare the pixel values.

SUMMARY OF THE INVENTION

Accordingly, the present invention provides a method which reduces the precision of the bits used to represent the pixel intensity values of a current frame and a reference frame in a video signal processor.

Such a precision reduction allows the search window to be stored using fewer bits than previously required by prior art techniques. The precision reduction also allows for simplification of the hardware required to compare the pixels of the current block with the pixels of the search window.

In one embodiment of the invention, the pixel intensity values are reduced to 2-bit values. The pixel intensity values of the pixels in a current block are averaged to determine an average pixel intensity value. Pixels in the current block having a pixel intensity value less than the average pixel intensity value are averaged to determine a low average pixel intensity value. Pixels in the current block having a pixel intensity value greater than the average pixel intensity value are averaged to determine a high average pixel intensity value.

The average pixel intensity value, low average pixel intensity value and high average pixel intensity value are used to determine 2-bit thresholded pixel intensity values for the pixels of the current block and the pixels of a corresponding search window. A "zero" value is assigned to each pixel having a pixel intensity value less than the low average pixel intensity value. A "one" value is assigned to each pixel having a pixel intensity value greater than the low average pixel intensity value and less than the average pixel intensity value. A "two" value is assigned to each pixel having a pixel intensity value greater than the average pixel intensity value and less than the high average pixel intensity value. A "three" value is assigned to each pixel having a pixel intensity value greater than the high average pixel intensity value. In this manner a thresholded current block and a thresholded search window are created.

The thresholded pixel intensity values of the current block and the search blocks of the search window are compared to determine a predetermined number of optimal search blocks which most closely match the current block. The non-thresholded current block is then compared with the non-thresholded optimal search blocks. The non-thresholded optimal search block which most closely approximates the current block is selected to estimate the current block.

In an alternate embodiment, the pixel intensity values of the current block and the search window are thresholded to 1-bit values using the average pixel intensity value. All pixel intensity values less than the average pixel intensity value are thresholded to a "zero" value. All pixel intensity values greater than the average pixel intensity value are thresholded to a "one" value. Processing then proceeds substantially as described above.

By calculating additional average pixel intensity values, the pixel intensity values of the current block and search window can be thresholded to values having other numbers of bits.

In a variation of the invention, the average pixel intensity values calculated in connection with a selected current block are used to calculate the thresholded pixel intensity values of additional current blocks and search windows which are proximate to the selected current block.

In another variation, the current block and search window are thresholded and an optimal search block is determined as described above. This optimal search block is then compared with the next current block. If the optimal search block is adequately representative of the next current block, then the optimal search block is also used to estimate the next current block. While this may not result in an optimal match for the next current block, a significant savings in processing time is realized.

In other embodiments, the present invention is used in conjunction with the previously described prior art block based motion estimation techniques.

The present invention also includes a circuit for comparing pixel intensity values of pixels in a current block to pixel intensity values of pixels in a reference block. This circuit includes a scoring circuit which compares the pixel intensity values of pixels in the current and reference blocks and creates a current score. The scoring circuit is coupled to a comparator circuit which compares the current score to a previously determined best score. The comparator circuit is coupled to an update circuit which replaces the best score with the current score and resets a counter if the current score is less than the best score. If the current score is not less than the best score, the update circuit retains the best score and increments the counter.

The present invention also includes a method of comparing pixel intensity values of pixels in a current block to pixel intensity values of pixels in a reference block. This method includes the steps of 1) comparing the pixel intensity values of pixels in the current and reference blocks to create a current score, 2) comparing the current score to a previously determined best score, 3) replacing the best score with the current score and resetting a count if the current score is less than the best score, and 4) retaining the best score and incrementing the count if the current score is greater than the best score.

The present invention will be more fully understood in view of the following drawings taken together with the detailed description.

BRIEF DESCRIPTION OF THE DRAWINGS

FIGS. 1a-1c are schematic diagrams which illustrate various frames used in block based motion estimation techniques;

FIGS. 6 and 7 are schematic diagrams illustrating thresholded a search window and a thresholded current block, respectively;

FIGS. 13-14 are schematic diagrams illustrating 2b it thresholding of a current block and a search window;

FIGS. 22a-22i are block diagrams illustrating a Wallace tree adder included in the scoring circuits of FIGS. 20a-20d;

DETAILED DESCRIPTION OF THE INVENTION

Figure 2A:
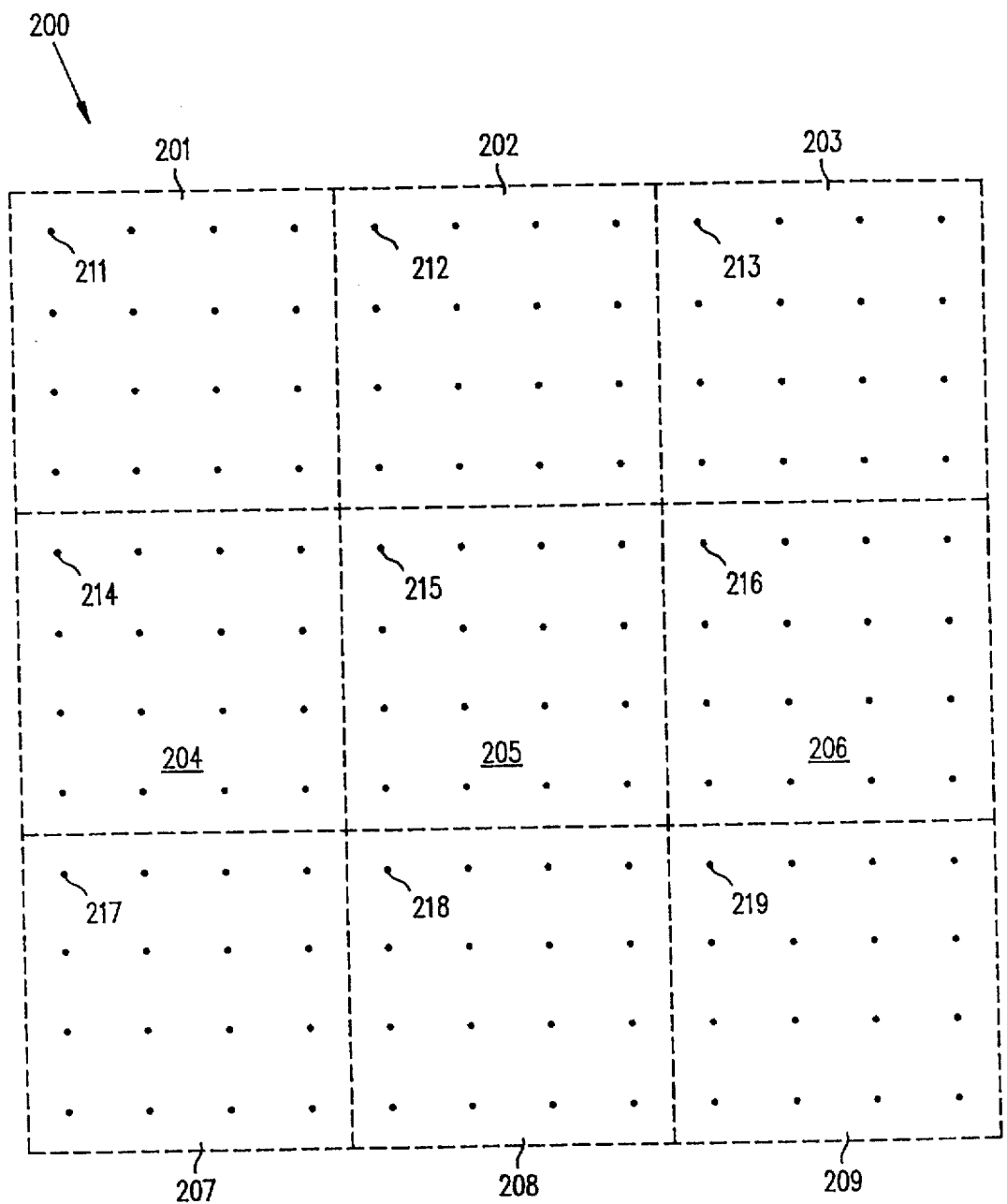
FIGS. 2a-2c are schematic diagrams illustrating algorithmic subsampling of a search window.
Figure 2B:
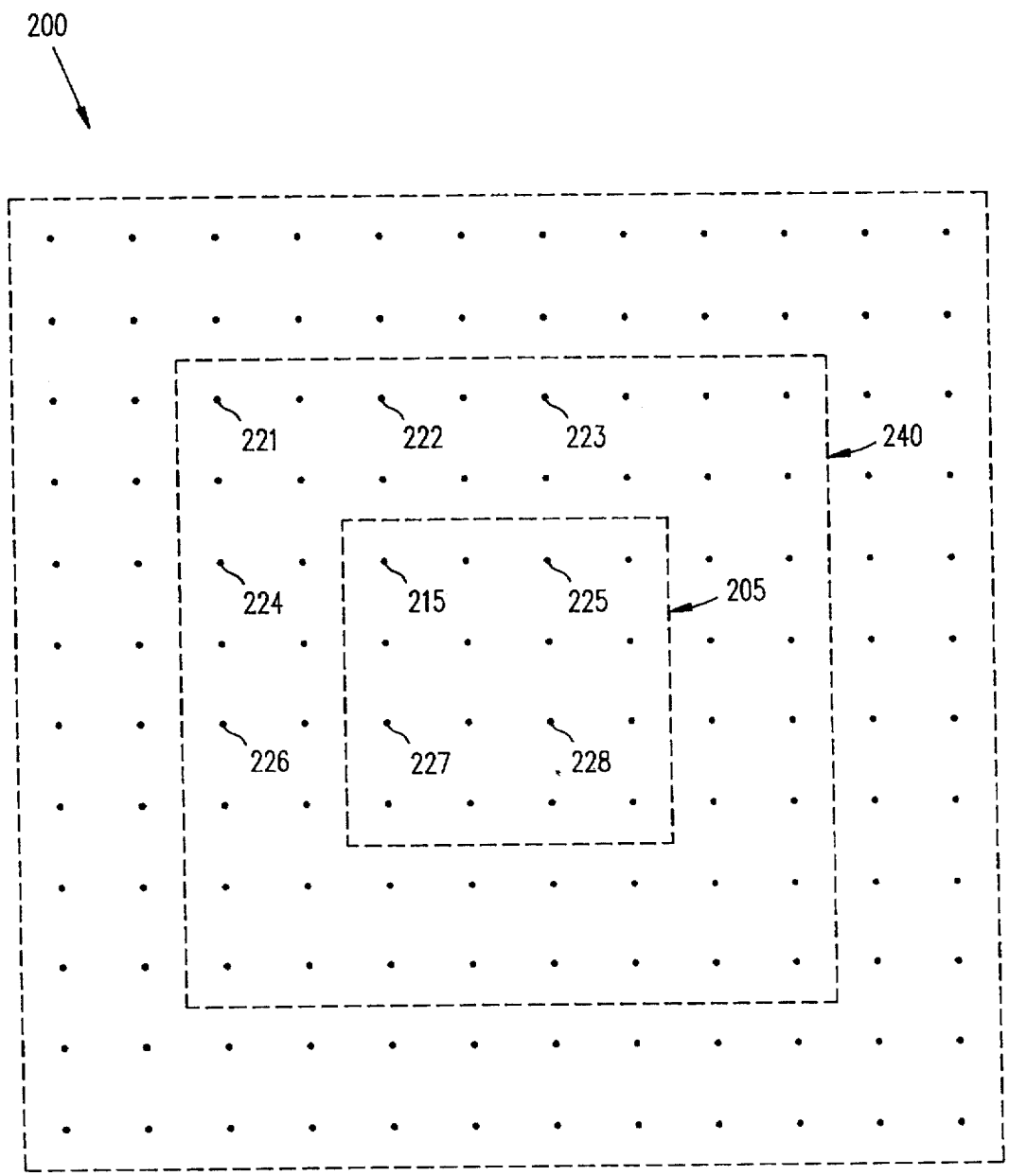
Figure 2C:
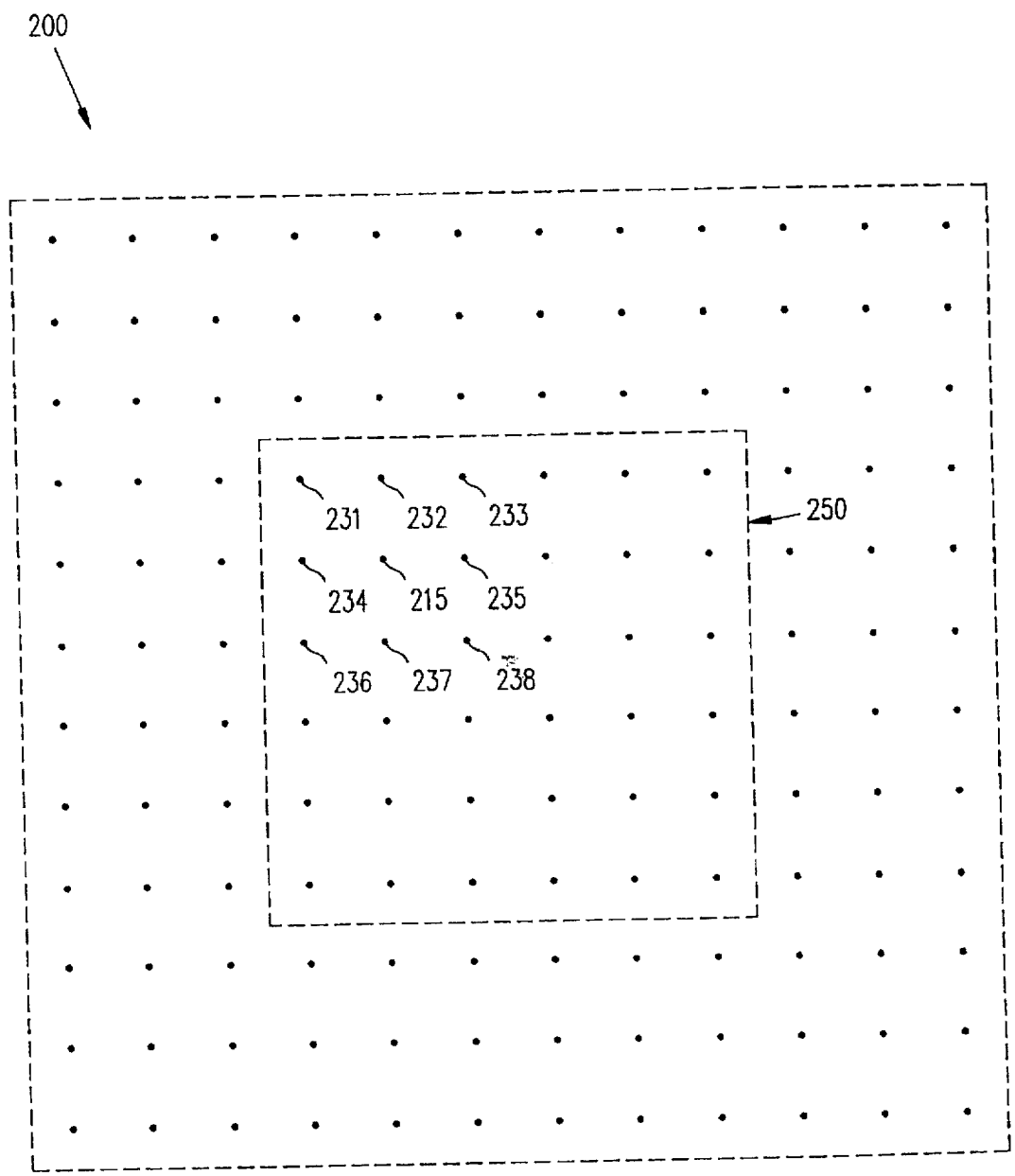
Figure 3:
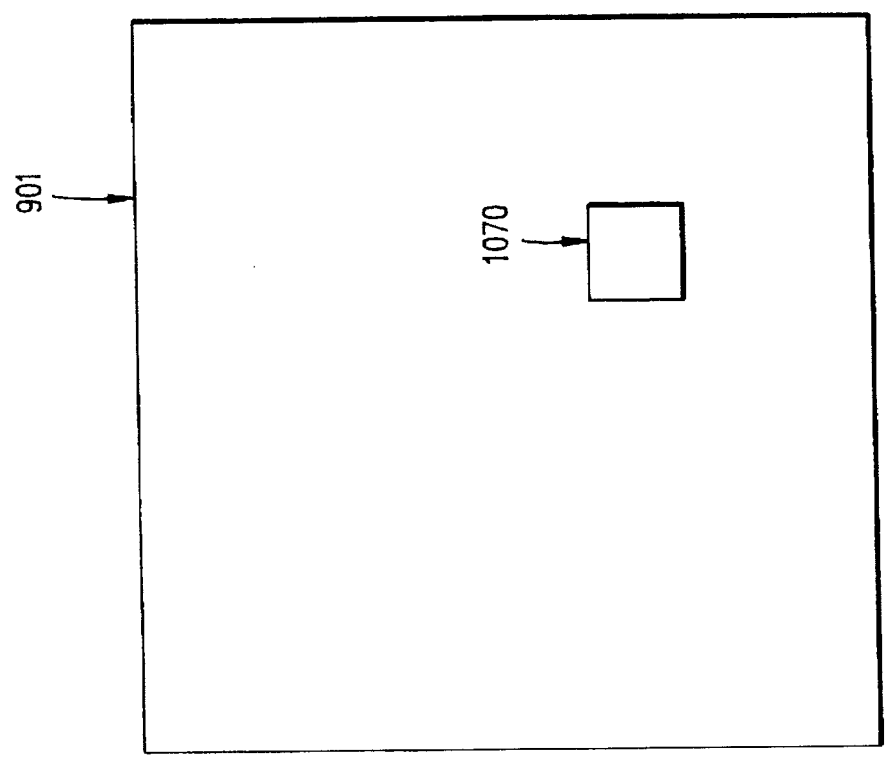
FIG. 3 is a schematic diagram of a search window within a reference frame and a current block within a current frame.
Figure 3:
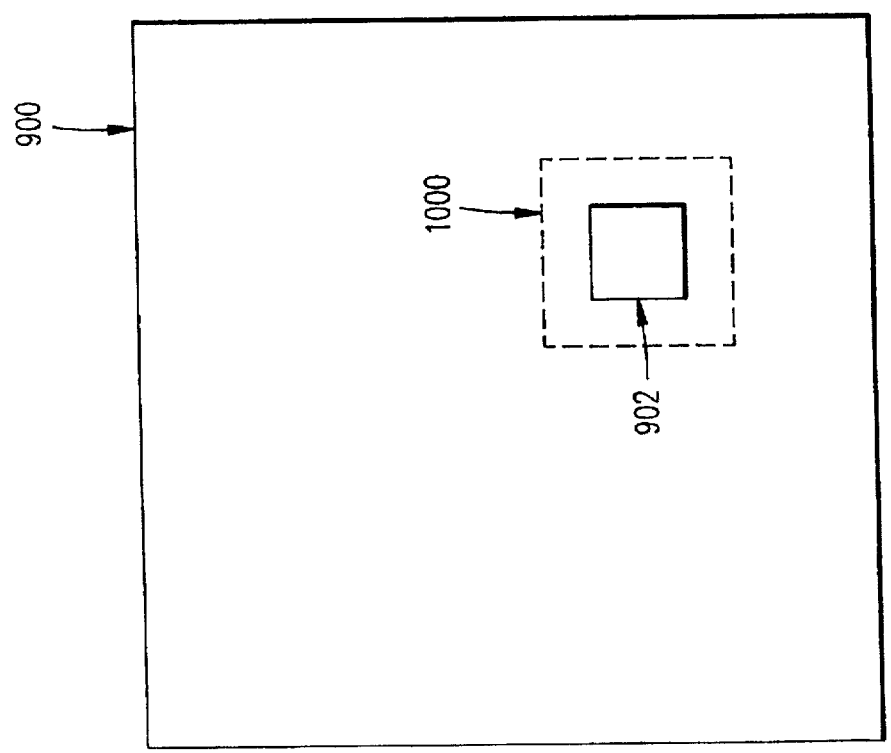

FIG. 3 is a schematic diagram of a search window 1000 within reference frame 900 and a current block 1070 within current frame 901. Search window 1000 is located about reference block 902. Reference block 902 and current block 1070 correspond to the same area on a video display terminal (not shown).

Figures 4, 5:
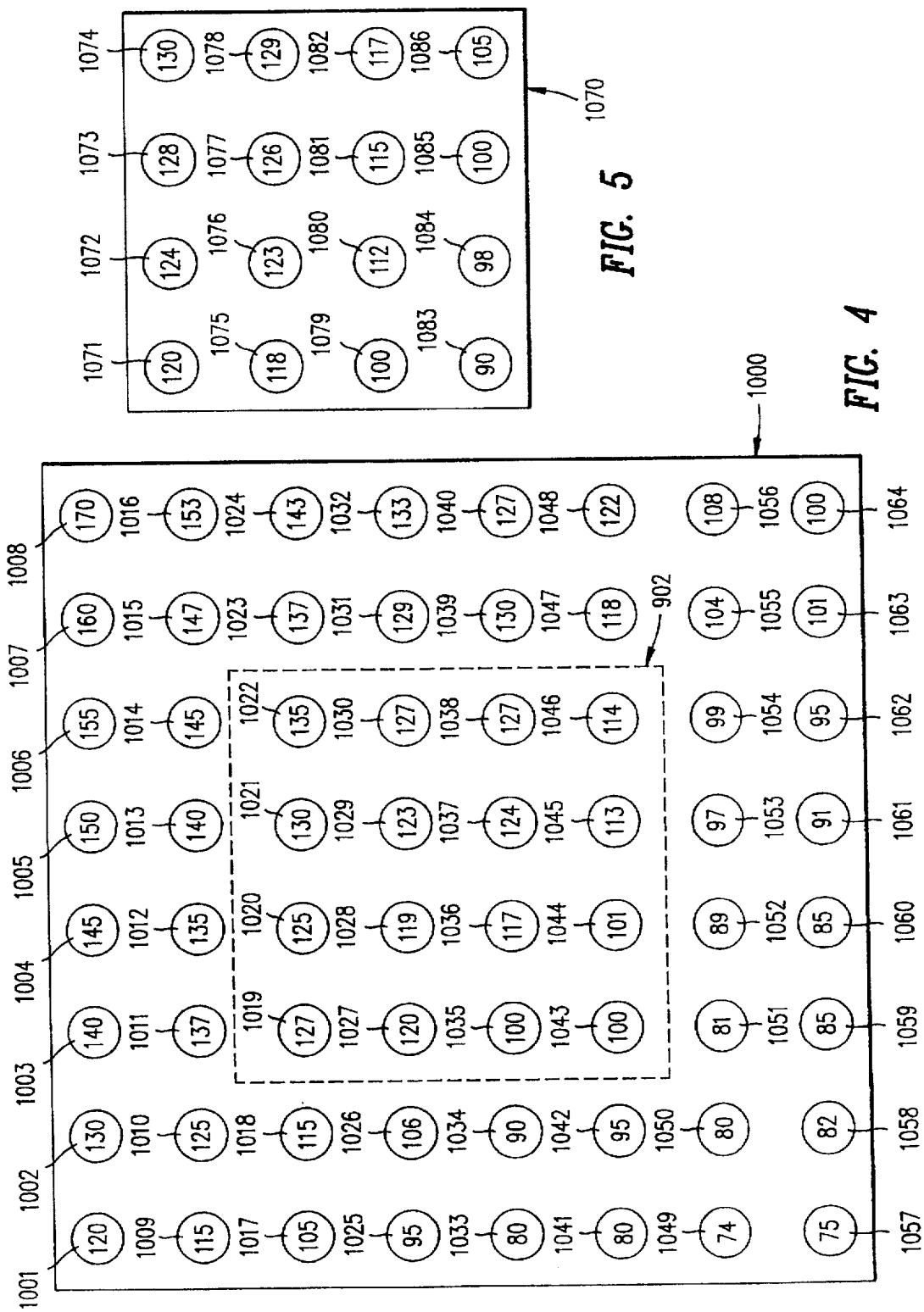
FIG. 4 is a schematic diagram of a search window, including individual pixels.
FIG. 5 is a schematic diagram of a current block, including individual pixels.

FIG. 4 is a schematic diagram of search window 1000 illustrating pixels 1001-1064. Pixels 1001-1064 form an 8×8 pixel array. Although search window 1000 is illustrated as an 8×8 pixel array, it is understood that search windows having other dimensions may be used. In one embodiment, a 24×40 pixel search window is used. The numbers shown within pixels 1001-1064 represent the intensity values of the associated pixels. In the illustrated example, it is assumed that the pixel intensity values are represented by 8-bit numbers. Thus, pixel 1001 has a pixel intensity value of 120 (0111 1000).

FIG. 5 is a schematic diagram of current block 1070 illustrating pixels 1071-1086. Pixels 1071-1086 form a 4×4 pixel array. Although current block 1070 is illustrated as a 4×4 pixel array, it is understood that current blocks having other dimensions can be used. In one embodiment, a 16×16 pixel current block is subsampled and hierarchically filtered to create an 8×8 pixel current block. The numbers shown within pixels 1071–1086 represent the intensity values of the associated pixels. Thus, pixel 1072 has a pixel intensity value of 124 (0111 1100).

In accordance with the invention, an average value pixel intensity value (P50) is determined for current block 1070 by summing the pixel intensity values of pixels 1071–1086 and dividing the resulting sum by the number of pixels in current block 1070. For current block 1070, the sum of the pixel intensity values of pixels 1071–1086 is equal to 1835 and the average pixel intensity value P50 is equal to 114 (i.e., 1835/16). The average pixel intensity values can be rounded down (as described herein) or rounded up.

After the average pixel intensity value P50 is determined, a low average pixel intensity value (P25) is determined by averaging the pixel intensity values of all pixels having an intensity value less than the average pixel intensity value P50. For example, in current block 1070, the low average pixel intensity value P25 is determined by summing the pixel intensity values of all pixels having a pixel intensity value less than 114 and dividing the resulting sum by the number of pixels having a pixel intensity value less than 114. There are six pixels 1079, 1080, 1083, 1084, 1085 and 1086 in current window 1070 having pixel intensity values less than 114. The sum of the pixel intensity values of pixels 1079, 1080, 1083, 1084, 1085 and 1086 is equal to 605. Therefore, the low average pixel intensity value P25 of these pixels is equal to 100 (i.e., 605/6).

In addition, a high average pixel intensity value (P75) is determined for all pixels having a pixel intensity value greater than the average pixel intensity value P50. For example, in current block 1070, the high average pixel intensity value P75 is determined by summing the pixel intensity values of all pixels having a pixel intensity value greater than 114 and dividing the resulting sum by the number of pixels having a pixel intensity value greater than 114. There are ten pixels 1071–1078, 1081 and 1082 in current window 1070 having pixel intensity values greater than 114. The sum of the pixel intensity values of pixels 1071–1078, 1081 and 1082 is equal to 1230. Consequently, the high average pixel intensity value P75 of these pixels is equal to 123 (i.e., 1230/10).

After determining the average pixel intensity values P25, P50 and P75, the pixel intensity values in search window 1000 and current block 1071 are thresholded from 8-bit values to 2-bit values in accordance with Table 2.

TABLE 2

| Encoded 2-Bit Value | 8-Bit Pixel Intensity |
| --- | --- |
| 0 | $-\infty \leq$ Pixel Intensity $<$P25 |
| 1 | P25$\leq$ Pixel Intensity $<$P50 |
| 2 | P50$\leq$ Pixel Intensity $<$P75 |
| 3 | P75$\leq$ Pixel Intensity $<\infty$ |

FIGS. 6 and 7 are schematic diagrams illustrating thresholded search window 1000 and thresholded current block 1070, respectively, after thresholding has been performed in accordance with Table 2. The thresholded pixel intensity values corresponding to pixels 1001–1064 and 1071–1086 are illustrated within each of pixels 1001–1064 and 1071–1086, respectively.

Block comparisons are then performed between the pixels of thresholded current block 1070 and the pixels of all of the search blocks in thresholded search window 1000. There are twenty five 4×4 search blocks present in search window 1000. Each 4×4 search block can be defined in terms of its upper left pixel. The search blocks in search window 1000 can be therefore defined as having upper left pixels 1001–1005, 1009–1013, 1017–1021, 1025–1029 and 1033–1037.

Each block comparison involves the calculation of the mean absolute difference between the pixel values of the thresholded search blocks and the thresholded current block 1070. The block comparison between the thresholded current block 1070 and the search block defined by upper left pixel 1001 is performed as follows:

Mean absolute difference =

$$|2 - 2| + |3 - 3| + |3 - 3| + |3 - 3| +$$

$$|2 - 2| + |3 - 3| + |3 - 3| + |3 - 3| +$$

$$|1 - 1| + |2 - 1| + |3 - 2| + |3 - 2| +$$

$$|0 - 0| + |1 - 0| + |2 - 1| + |2 - 1| = 6$$

In the manner previously described, twenty five mean absolute differences are calculated, one for each search block.

Figure 8:
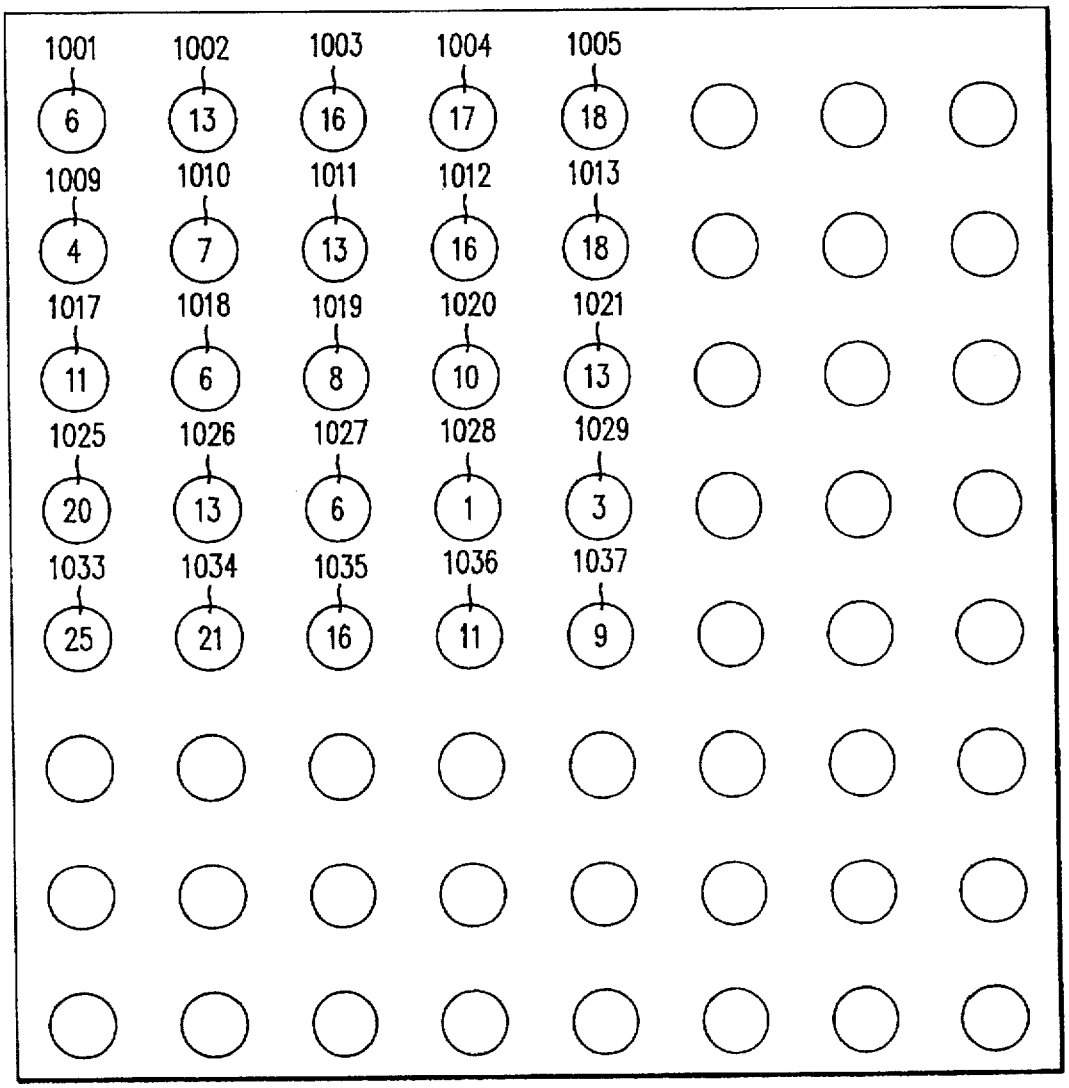
FIG. 8 is a schematic diagram illustrating the mean absolute difference associated with each search block in a search window.

FIG. 8 is a schematic diagram illustrating the mean absolute difference for each of the twenty five search blocks. The mean absolute difference of each search block is shown within the pixel which defines the upper left corner of the search block. Thus, the mean absolute differences associated with the search blocks defined by upper left pixels 1017, 1018, 1019, 1020 and 1021 are 11, 6, 8, 10 and 13, respectively.

In general, a low mean absolute difference indicates that the search block closely approximates the current block 1070. A predetermined number (k) of the block comparisons resulting in the lowest mean absolute differences are saved. In the present example, k is set equal to three. Although k is typically set to a value between one and four, in other embodiments, other values of k can be selected. As k increases, so does the quality of the block comparison. As shown in FIG. 8, the block comparisons resulting in the three lowest mean absolute differences occur in connection with the search blocks defined by upper left pixels 1009, 1028 and 1029.

Block comparisons are then performed using the non-thresholded current block 1070 and the non-thresholded search blocks determined in the previous step (i.e., the non-thresholded search blocks defined by upper left pixels 1009, 1028 and 1029). The block comparison between the non-thresholded current block 1070 and the non-thresholded search block defined by upper left pixel 1009 is performed as follows:

Mean absolute difference =

$$|115 - 120| + |125 - 124| + |137 - 128| + |135 - 130| +$$

$$|105 - 118| + |115 - 123| + |127 - 126| + |125 - 129| +$$

$$|95 - 100| + |106 - 112| + |120 - 115| + |119 - 117| +$$

$$|80 - 90| + |90 - 98| + |100 - 100| + |117 - 105| = 94.$$

In the manner previously described, the mean absolute differences are calculated for the non-thresholded search blocks defined by upper left pixels 1028 and 1029. The mean absolute differences associated with the non-thresholded search blocks defined by upper left pixels 1028 and 1029 are 16 and 64, respectively. The non-thresholded search block which results in the lowest mean absolute difference is used to estimate current block 1070. Thus, in the given example, the non-thresholded search block defined by upper left pixel 1028 is used to estimate current block 1070.

Many variations of the present invention are possible. For example, rather than performing the block comparisons using the mean average difference, other equations can be used. For example, the pixels of the search blocks and current window can be compared by calculating the mean squared error. The mean squared error is calculated by squaring the differences of the thresholded pixel intensity values. In another variation, the thresholds can be calculated as the median of the pixel intensity values rather than the mean of the pixel intensity values.

In another variation, a different number of bits is used to threshold the current block and the search window. In a 1-bit thresholding variation, all pixel intensity values greater than the average pixel intensity value P50 are given a "1" value and all pixel intensity values less than the average pixel intensity value P50 are given a "0" value.

In a 3-bit thresholding variation, four additional average pixel intensity values are calculated in addition to the average pixel intensity values P25, P50 and P75 calculated for the 2-bit thresholding variation previously described. Thus, average pixel intensity value P12.5 is the average pixel intensity value of all pixels having an intensity value less than pixel intensity value P25; average pixel intensity value P37.5 is the average pixel intensity value of all pixels having an intensity value less than pixel intensity value P50 and greater than pixel intensity value P25; average pixel intensity value P62.5 is the average pixel intensity value of all pixels having an intensity value less than pixel intensity value P75 and greater than pixel intensity value P50; and average pixel intensity value P87.5 is the average pixel intensity value of all pixels having an intensity value greater than pixel intensity value P75. The pixel intensity values in the search window and the current block are thresholded to 3-bit values in accordance with Table 3.

TABLE 3

| Encoded 3-Bit Value | Pixel Intensity Value |
| --- | --- |
| 0 | $-\infty \leq$ Pixel Intensity $<$ P12.5 |
| 1 | P12.5 $\leq$ Pixel Intensity $<$ P25 |
| 2 | P25 $\leq$ Pixel Intensity $<$ P37.5 |
| 3 | P37.5 $\leq$ Pixel Intensity $<$ P50 |
| 4 | P50 $\leq$ Pixel Intensity $<$ P62.5 |
| 5 | P62.5 $\leq$ Pixel Intensity $<$ P75 |
| 6 | P75 $\leq$ Pixel Intensity $<$ P87.5 |
| 7 | P87.5 $\leq$ Pixel Intensity $< \infty$ |

In another variation, the average pixel intensity values P25, P50 and P75 are calculated for a selected current block. These average pixel intensity values P25, P50 and P75 are then used to threshold additional current blocks and search windows which are proximate to the selected current block. The thresholded values can be re-used because the search areas overlap. In another variation, the average pixel intensity values P25, P50 and P75 are calculated from the combined statistics of several current blocks.

The number of additional current blocks and search windows that can be thresholded from a single current block is dependent upon the image. More additional current blocks and search windows can be thresholded from a single set of average pixel intensity values if the blocks have similar average pixel intensity values. In one embodiment, the average pixel intensity values P50 of adjacent current blocks are compared. If these average pixel intensity values are approximately the same, the average pixel intensity values P25, P50 and P75 previously calculated can be used to threshold the new current block and search window.

Figures 9, 10:
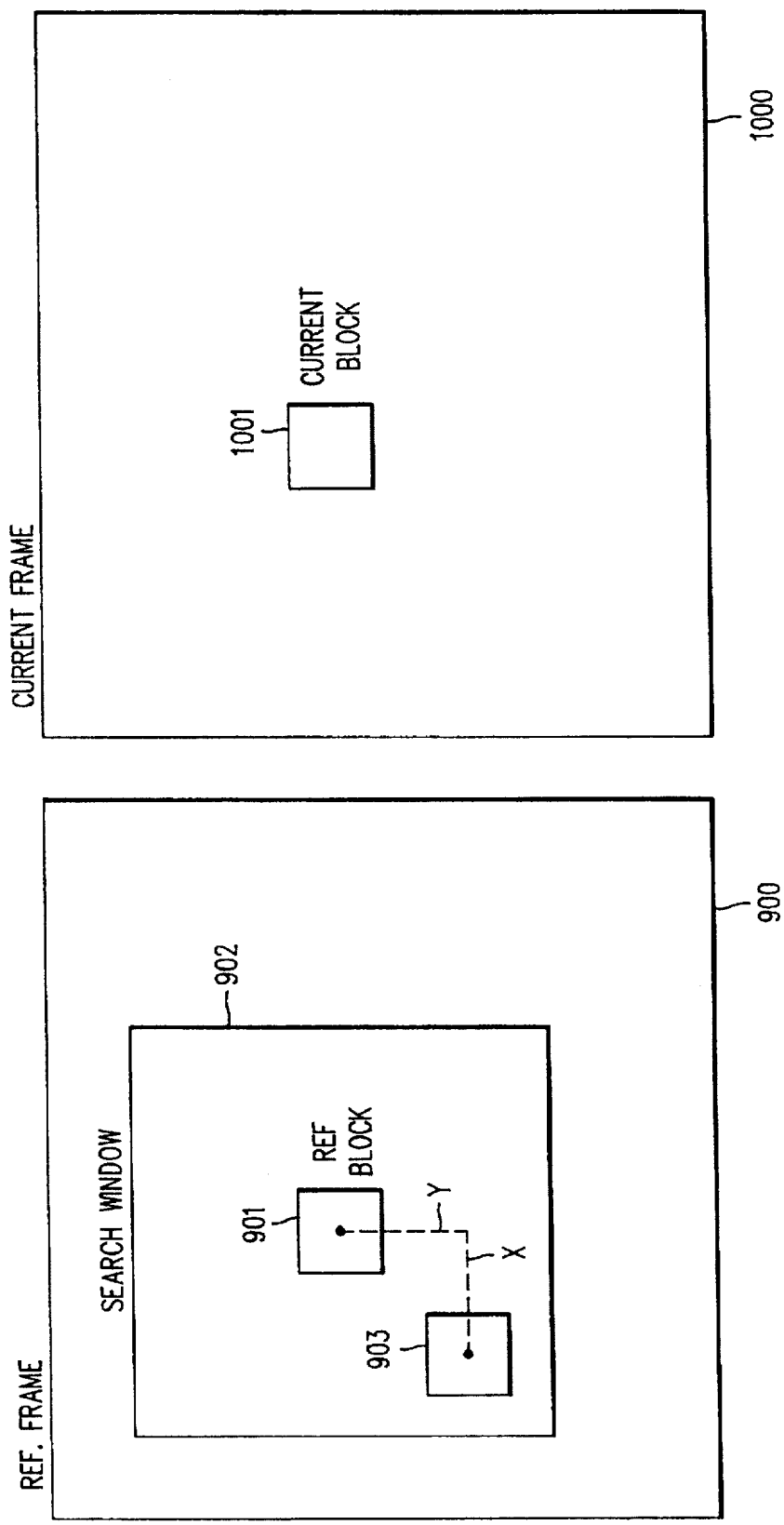
FIGS. 9-12 are schematic diagrams illustrating the determination of an "adjacent" search block.

In yet another variation of the present invention, the current block and search window are thresholded and the optimal search block is determined as described above. The next current block is then compared with the search block "adjacent" to the previously determined optimal search block. FIGS. 9–12 are schematic diagrams illustrating how the "adjacent" search block is determined. FIG. 10 shows current frame 1000 and current block 1001. FIG. 9 shows reference frame 900, search window 902 corresponding to current block 1001, and optimal search block 903. FIG. 9 also shows the reference block 901 which has the same position within reference frame 900 as current block 1001 has within current frame 1000. Optimal search block 903 is offset from reference frame 901 by X pixels along the horizontal axis and by Y pixels along the vertical axis.

Figure 12:
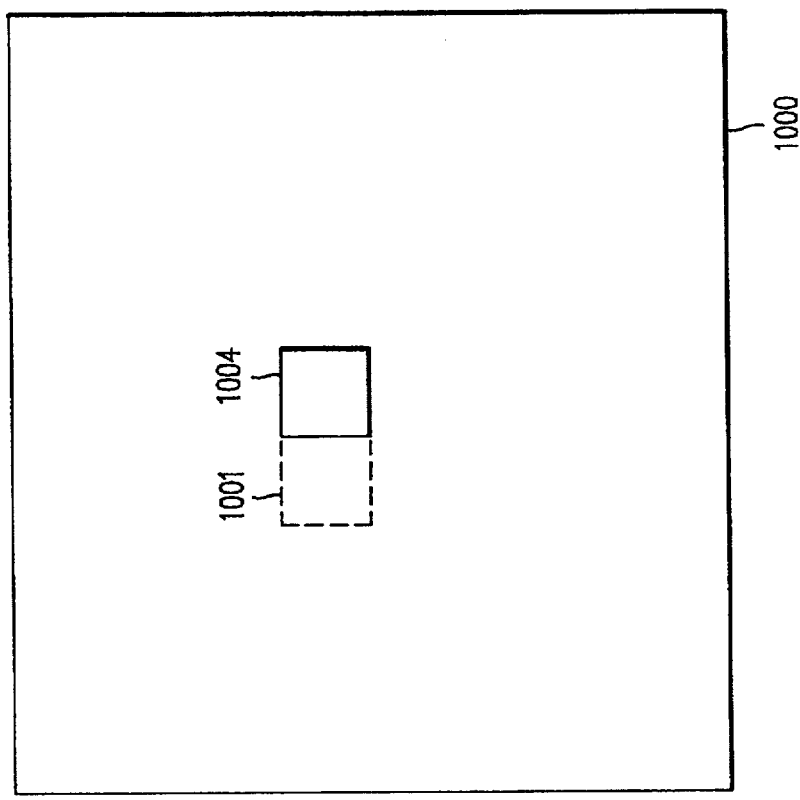
Figure 11:
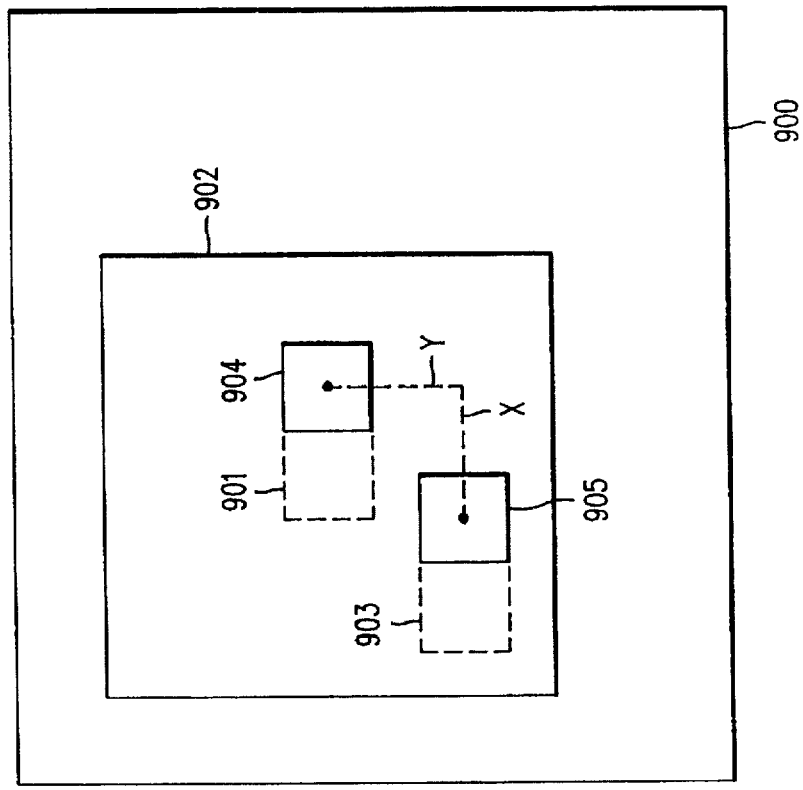

FIG. 12 illustrates next current block 1004. FIG. 11 shows reference block 904 which has the same position within reference frame 900 as next current block 1004 has within current frame 1000. FIG. 11 also shows "adjacent" search block 905, which is offset from next reference block 904 by X pixels along the horizontal axis and Y pixels along the vertical axis.

If "adjacent" search block 905 is adequately representative of next current block 1004, then the adjacent search block 9005 is used to estimate the next current block 1004. "Adjacent" search block 905 is adequately representative of next current block 1004 if the mean absolute difference between "adjacent" search block 905 and next current block 1004 is equal to or less than the mean absolute difference between optimal search block 903 and current block 1001. While "adjacent" search block 905 may not be the optimum match for next current block 1004, a significant amount of time is saved by using this technique. This time can be used to improve the overall quality or compression ratio of the video compression.

In a variation of the 2-bit thresholding embodiment, the mean absolute difference between the current search block and the average pixel intensity value P50 is calculated. For example, in current block 1070 (FIG. 5), the average pixel intensity value P50 is 114. The mean absolute difference between the pixel intensity values of the pixels in current block 1070 and the average pixel intensity value P50 is equal to:

|114 − 120| + |114 − 124| + |114 − 128| + |114 − 130| +

|114 − 118| + |114 − 123| + |114 − 126| + |114 − 129| +

|114 − 100| + |114 − 112| + |114 − 115| + |114 − 117| +

|114 − 90| + |114 − 98| + |114 − 100| + |114 − 105| = 169.

This mean absolute difference is then divided by the number of pixel comparisons performed (i.e., 16) to obtain a range defining value R. In the present example, range defining value R is equal to 10 (i.e., 169/16).

The average pixel intensity value P25 is then defined as the average pixel intensity value P50 minus the range defining value R. In the present example, average pixel intensity value P25 is equal to 104 (i.e., 114−10).

The average pixel intensity value P75 is defined as the average pixel intensity value P50 plus the range defining value R. In the present example, average pixel intensity value P75 is equal to 124 (i.e., 114+10).

Figures 13, 14:
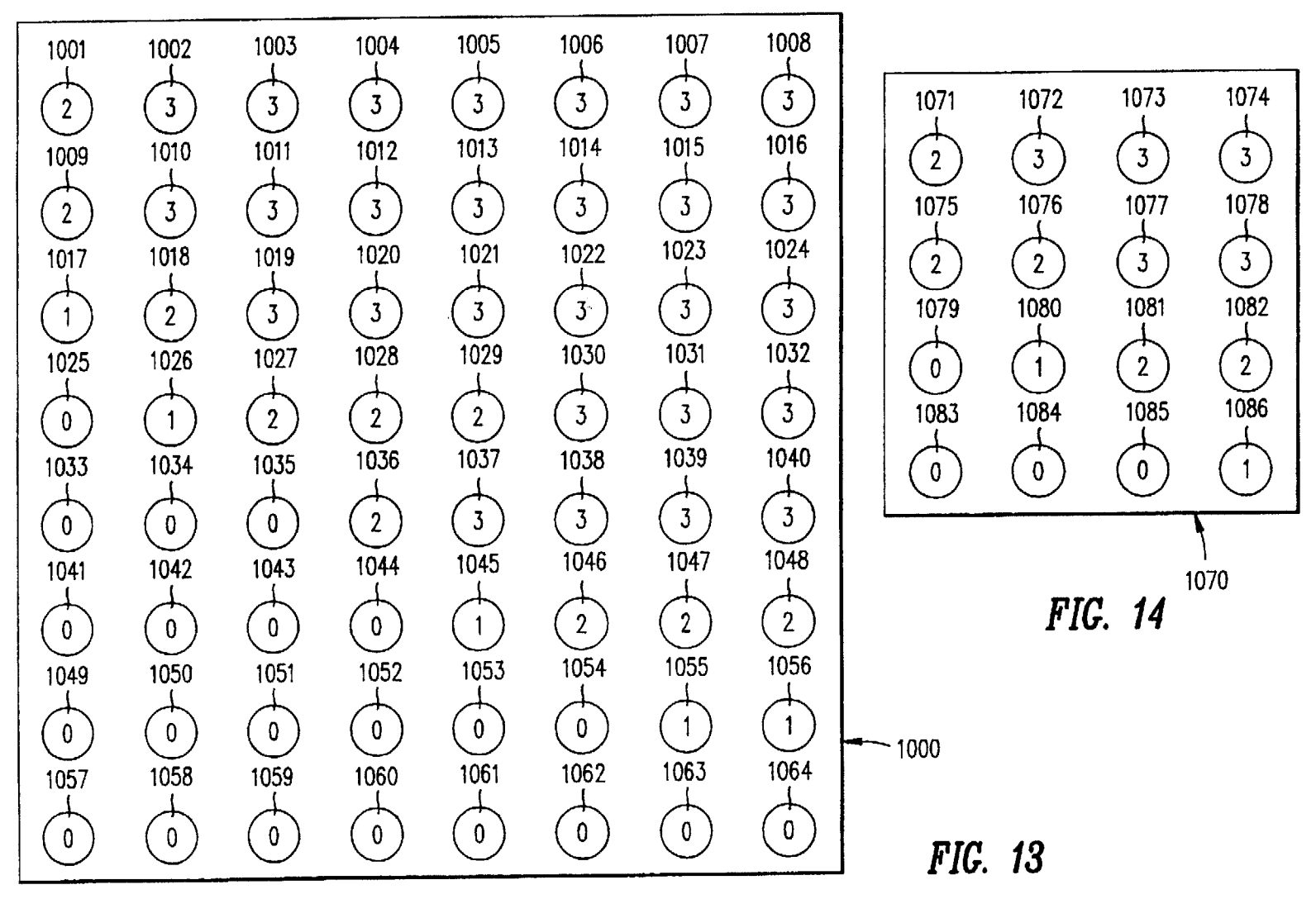
Figure 15:
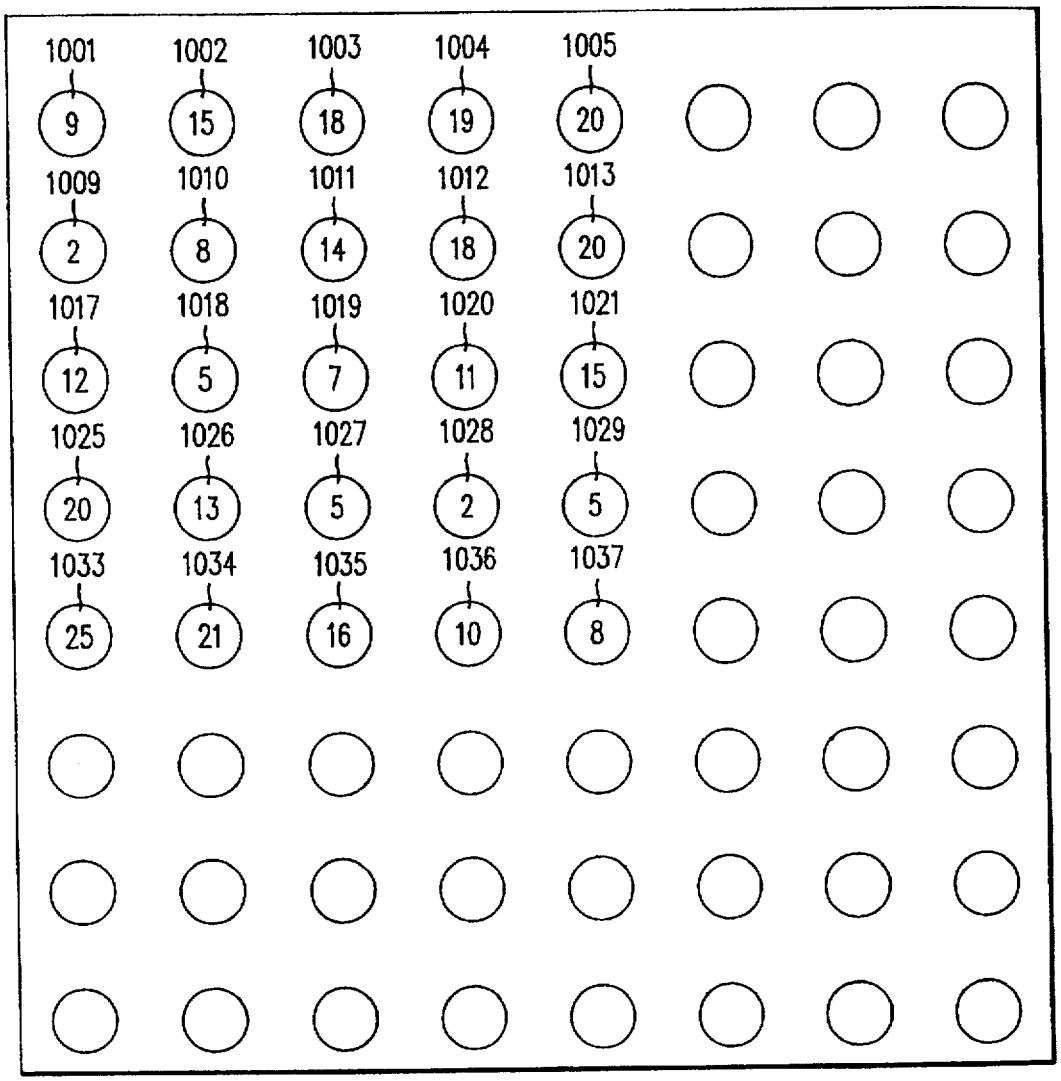
FIG. 15 is a schematic diagram illustrating mean absolute differences obtained when comparing a current block with each of the search blocks within a search window.

Processing then proceeds as previously described in connection with the 2-bit thresholding scheme. FIGS. 13–14 illustrate the 2-bit thresholding of current block 1070 (FIG. 5) and search window 1000 (FIG. 4) using average pixel intensity values P25, P50 and P75 of 104, 114 and 124, respectively. FIG. 15 is a schematic diagram illustrating the mean absolute differences obtained when comparing the current block 1071 of FIG. 14 with each of the search blocks within search window 1000 of FIG. 13. The mean absolute difference of each search block is shown within the pixel which defines the upper left corner of the search block. Thus, the mean absolute difference associated with the search block defined by upper left pixel 1028 is 2.

The invention can also be used in conjunction with prior art block based motion estimation techniques. In one alternative, hierarchical filtering and block subsampling is performed on the search window and current block prior to thresholding. In a particular example, a 16×16 pixel current block and a 40×40 pixel search window are filtered and subsampled prior to thresholding. Two-bit thresholding and block comparisons are then performed as previously described. Non-thresholded block comparisons are then performed using the best k block comparisons. The total gain in performance for this example is 64×, with a 16× gain being related to filtering and subsampling and a 4× gain being related to the 2-bit thresholding. Performance can be measured in bit operations per block comparison or in logic gates per block comparison.

In another embodiment, algorithmic subsampling is performed after the search window and current block are thresholded. This advantageously reduces the number of block comparisons which must be performed.

In yet another embodiment, block subsampling is performed before the search window and current block are thresholded, and algorithmic subsampling is performed after the search window and current block are thresholded.

In another embodiment, the search window and current block are hierarchically filtered prior to thresholding.

Figure 16:
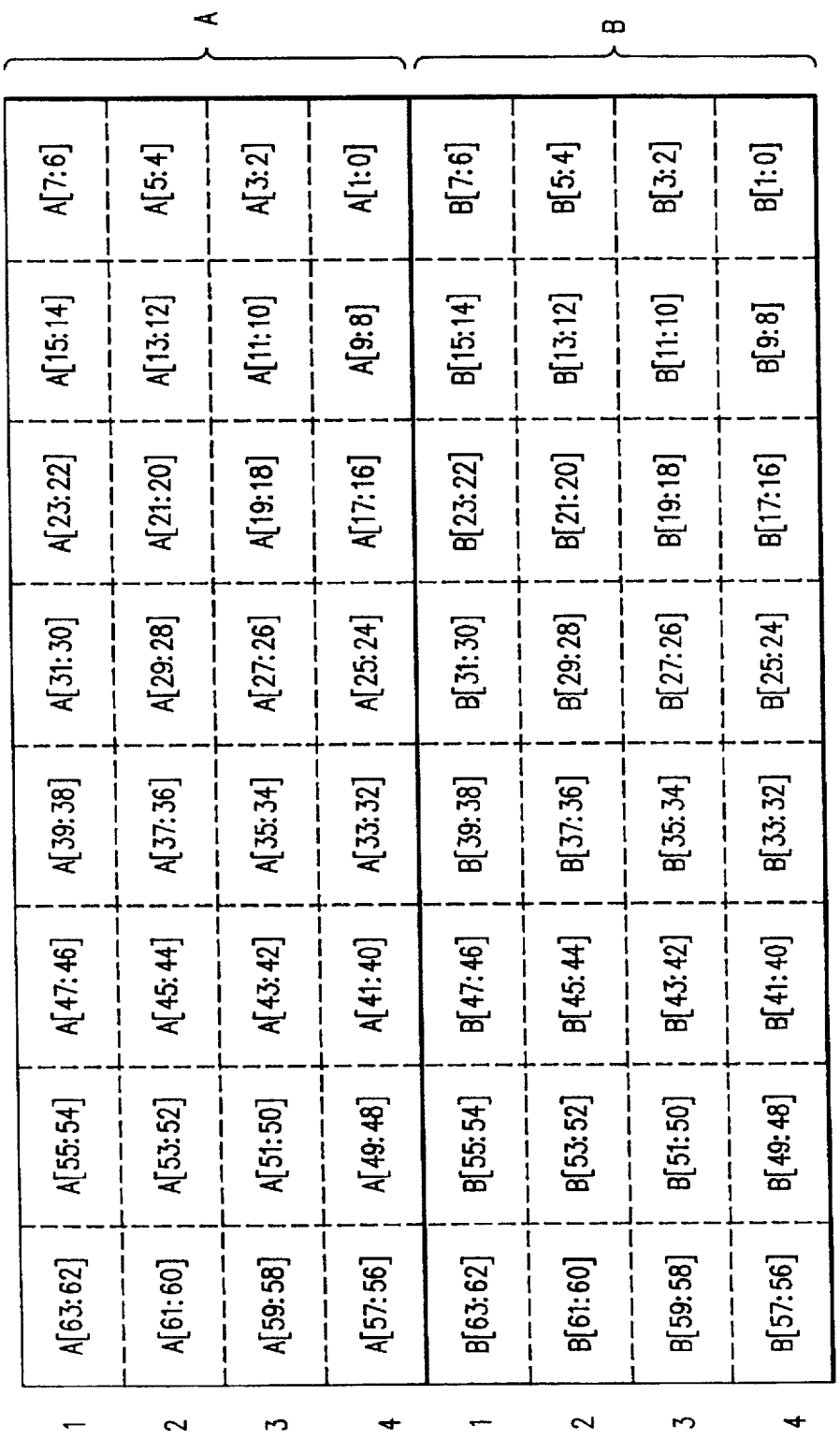
FIG. 16 is a schematic diagram illustrating an 8×8 pixel current block.

FIGS. 16–24 illustrate a method and structure for processing pixels in a current block 1501 (FIG. 16) and a search window 1601 (FIG. 17) in accordance with one embodiment of the present invention. FIG. 16 illustrates 8×8 pixel current block 1501. Each pixel intensity value in current block 1501 has been reduced to a 2-bit thresholded value as previously described. In one embodiment, current block 1501 is derived from a 16×16 pixel current block (not shown) which has also been hierarchically filtered. As illustrated in FIG. 16, the 8×8 pixel current block 1501 is divided into two 4×8 pixel half blocks, A and B. Half block A consists of 32 2-bit pixel intensity values which can be represented as a single 64-bit word A[63:0]. The manner in which the 2-bit pixel intensity values are embedded in the 64-bit word is illustrated in FIG. 16. For example, the pixel intensity value of the pixel in the first row, second column of half block A is defined by bits 54 and 55 of A[63:0]. Similarly, half block B is represented by a single 64-bit word B[63:0]. In this manner, current block 1501 is represented by two 64-bit words.

Figure 17:
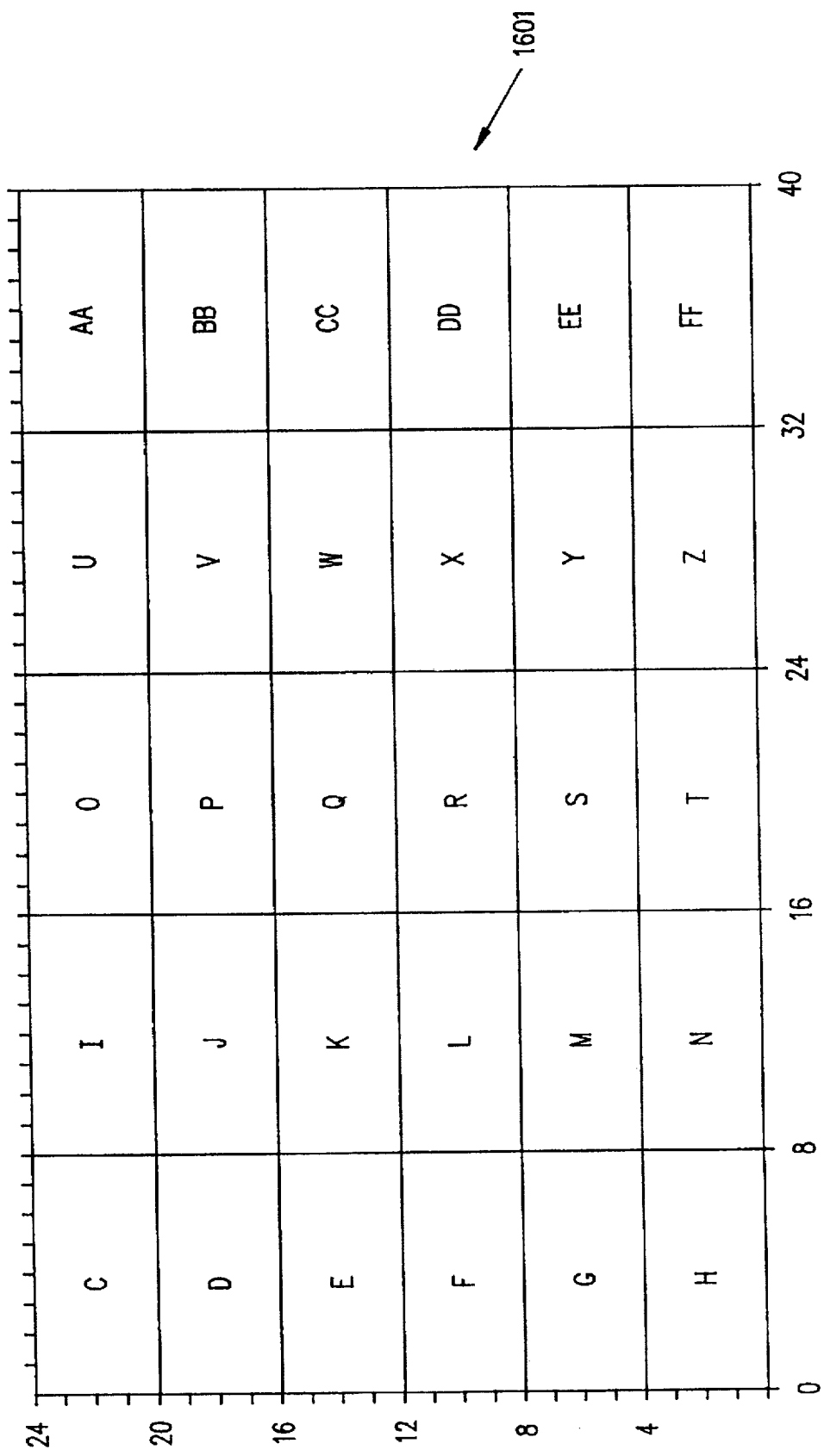
FIG. 17 is a schematic diagram illustrating a search window.

FIG. 17 is a schematic diagram of search window 1601. In the embodiment illustrated, search window 1601 is a 24×40 pixel block which is divided into 30 4×8 pixel half blocks C-FF. The pixel intensity values of half blocks C-FF are thresholded to 2-bit values as previously described. In one embodiment, search window 1601 is derived from an 48×80 pixel block (not shown) which is also hierarchically filtered. Each of half blocks C-FF is represented by a 64-bit word in the same manner previously described for half blocks A and B (FIG. 16).

As previously discussed, current block 1501 (FIG. 16) is compared with each possible search block within search window 1601 (FIG. 17). There are 561 search blocks within search window 1601 (17 search blocks along the vertical axis by 33 search blocks along the horizontal axis).

Figure 18:
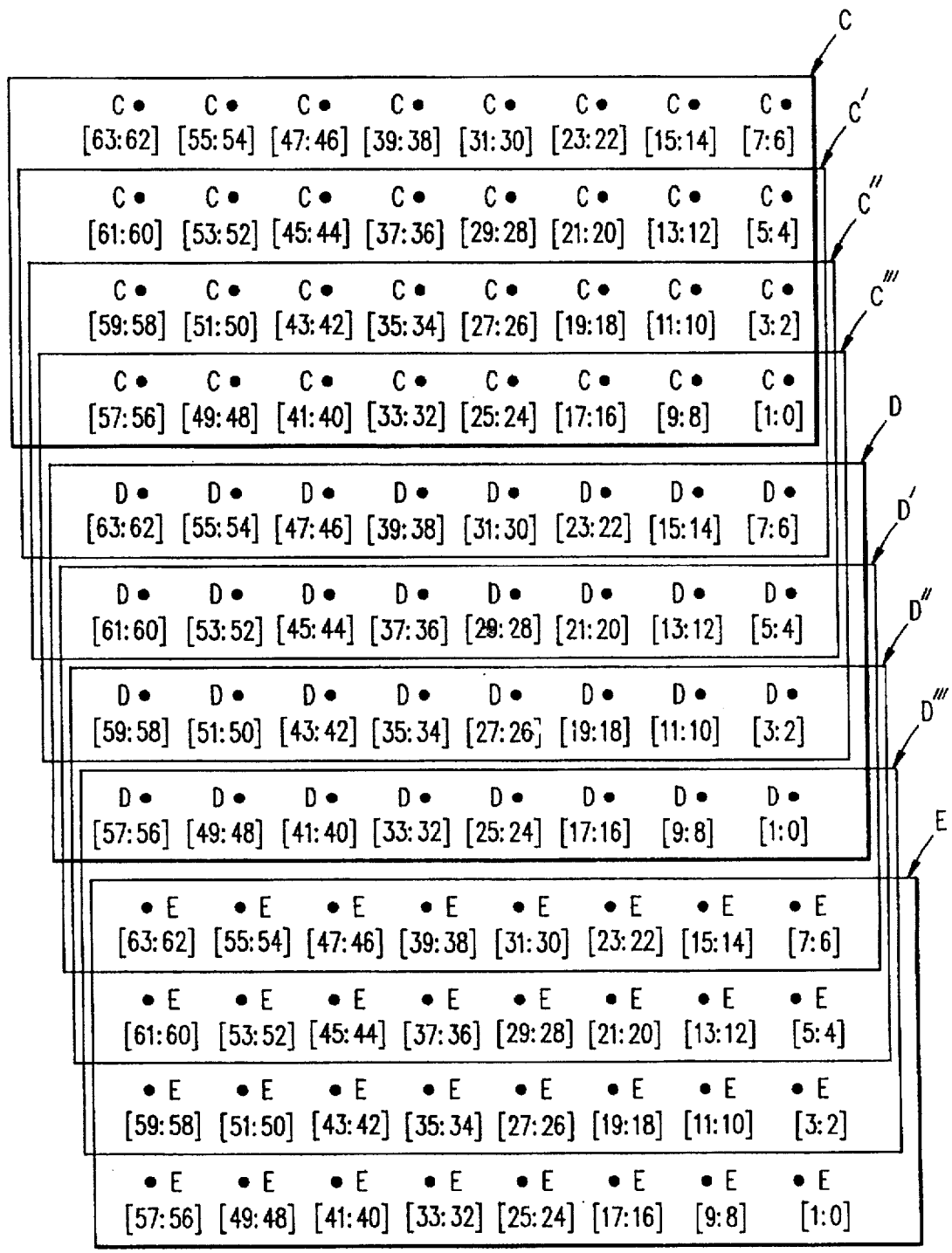
FIG. 18 is a schematic drawing illustrating how the search window of FIG. 17 is divided for comparison with the current block of FIG. 16.

FIG. 18 is a schematic drawing illustrating how these comparisons are performed. As described in more detail below, half block A (i.e., A[63:0]) of current block 1501 (FIG. 16) is compared with half block C (i.e., C[63:0]) of search window 1601 (FIG. 17) and half block B (i.e., B[63:0]) of current block 1501 (FIG. 16) is compared with half block D (i.e., D [63:0]) of search window 1601 (FIG. 17). The results of these comparisons are combined to create a comparison of current block 1501 to the first search block within search window 1601.

To complete another comparison between current block 1501 and a search block within search window 1601, half block A (i.e., A[63:0]) is compared with half block C' (FIG. 18) and half block B (i.e., B [63:0]) is compared with half block D' (FIG. 18) and the results are combined. Half blocks C' and D' are 4×8 pixel blocks which are vertically shifted one row down from half blocks C and D, respectively. Thus, half block C' consists of the last three rows of pixels of half block C (i.e., C[61:56], C[53:48], C[45:40], C[37:32], C[29:24], C[21:16], C[13:8] and C[5:0]) and the first row of pixels of half block D (i.e., D[63:62], D[55:54], D[47:46], D[39:38], D[31:30], D[23:22], D[15:14] and D[7:6]). Similarly, half block D' consists of the last three rows of pixels of half block D (i.e., D[61:56], D[53:48], D[45:40], D[37:32], D[29:24], D[21:16], D[13:8] and D[5:0]) and the first row of half block E.

To complete a third comparison, the above described process is repeated, with half block A being compared with half block C" and half block B being compared to half block B" A fourth comparison is completed by comparing half block A with half block C'" and half block B with half block D'". Each successive comparison involves shifting the search block vertically downward by one row. After the bottom of search window 1601 is reached (i.e. after half blocks A and B are compared with half blocks G and H, respectively), another vertical pass begins, with processing returning to the uppermost vertical position. In each subsequent vertical pass, a horizontal offset of one pixel (i.e., one column) is introduced. Thus, during the first comparison of the second vertical pass, half block A is compared to the 7 rightmost columns of half block C (i.e., C[55:0]) and the leftmost column of half block I (i.e., I[63:56]), and half block B is compared with the 7 rightmost columns of half block D (i.e., D[55:0]) and the leftmost column of half block J (i.e., J[63:56]). This process continues until all search blocks within search window 1601 have been compared with half blocks A and B.

Figure 19:
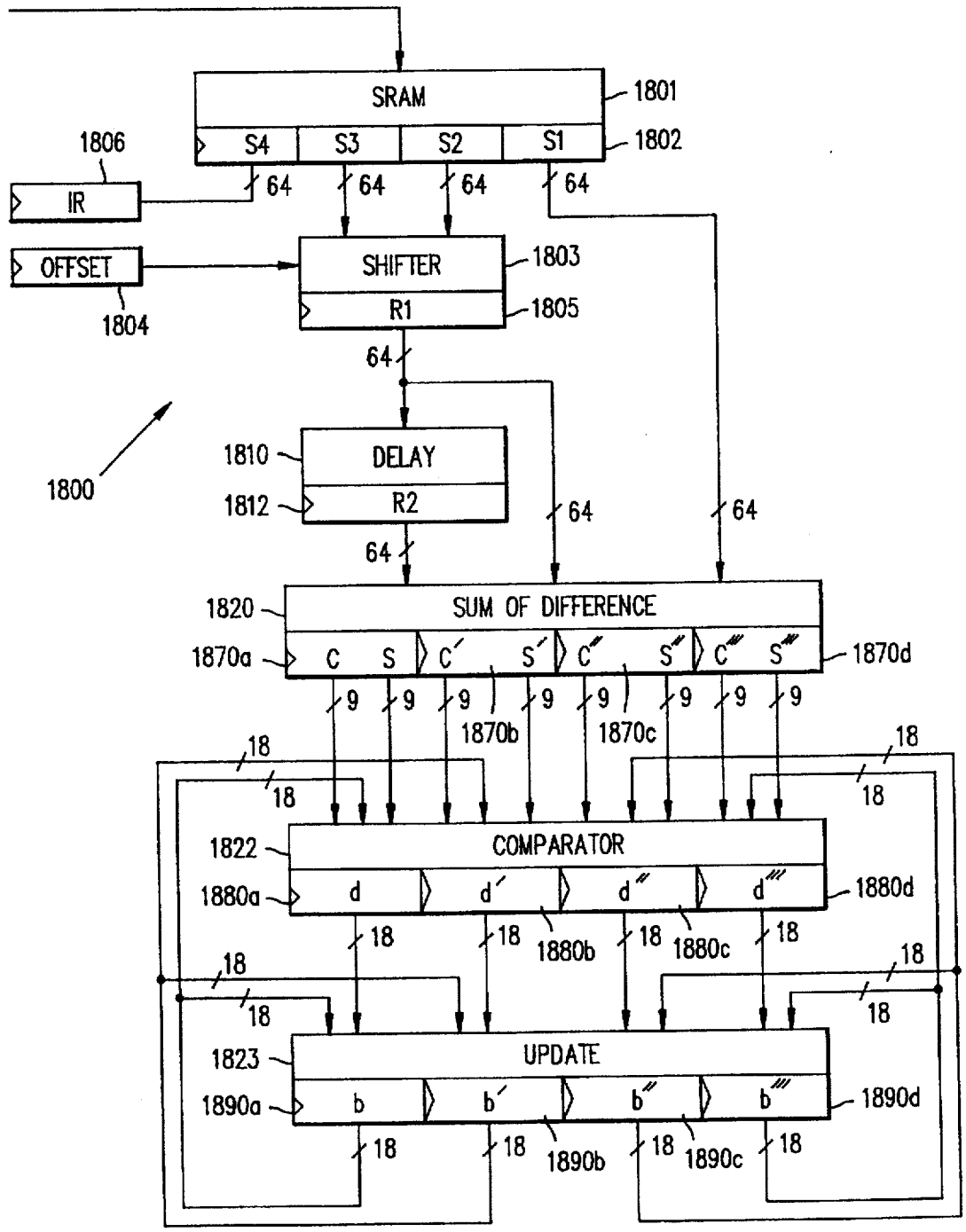
FIG. 19 is a block diagram which illustrates a circuit used to compare the current block of FIG. 16 with search blocks within the search window of FIG. 17.
Figure 20A:
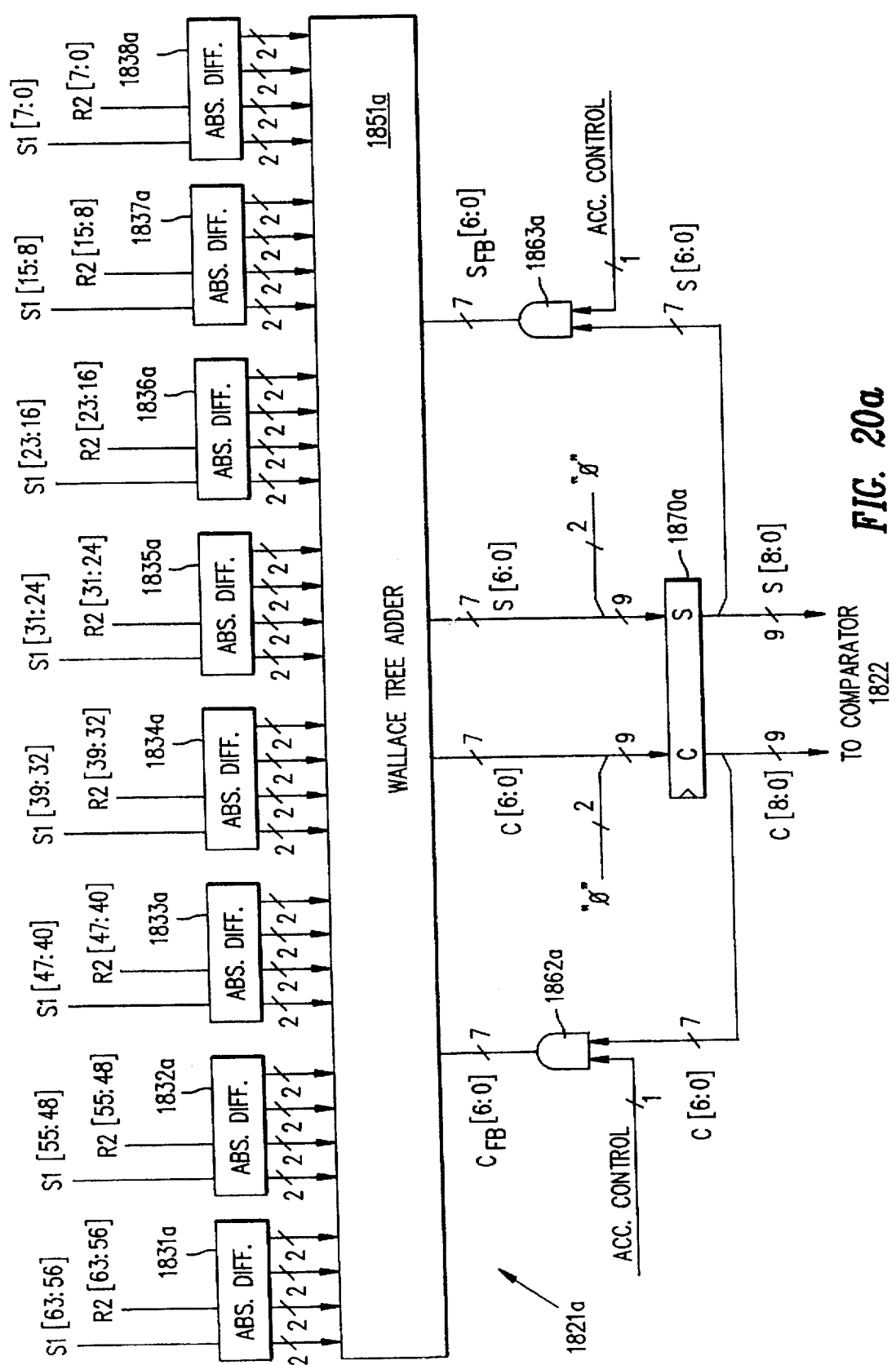
FIG. 20a-20d are block diagrams illustrating parallel scoring circuits included in the circuitry of FIG. 19.
Figure 20B:
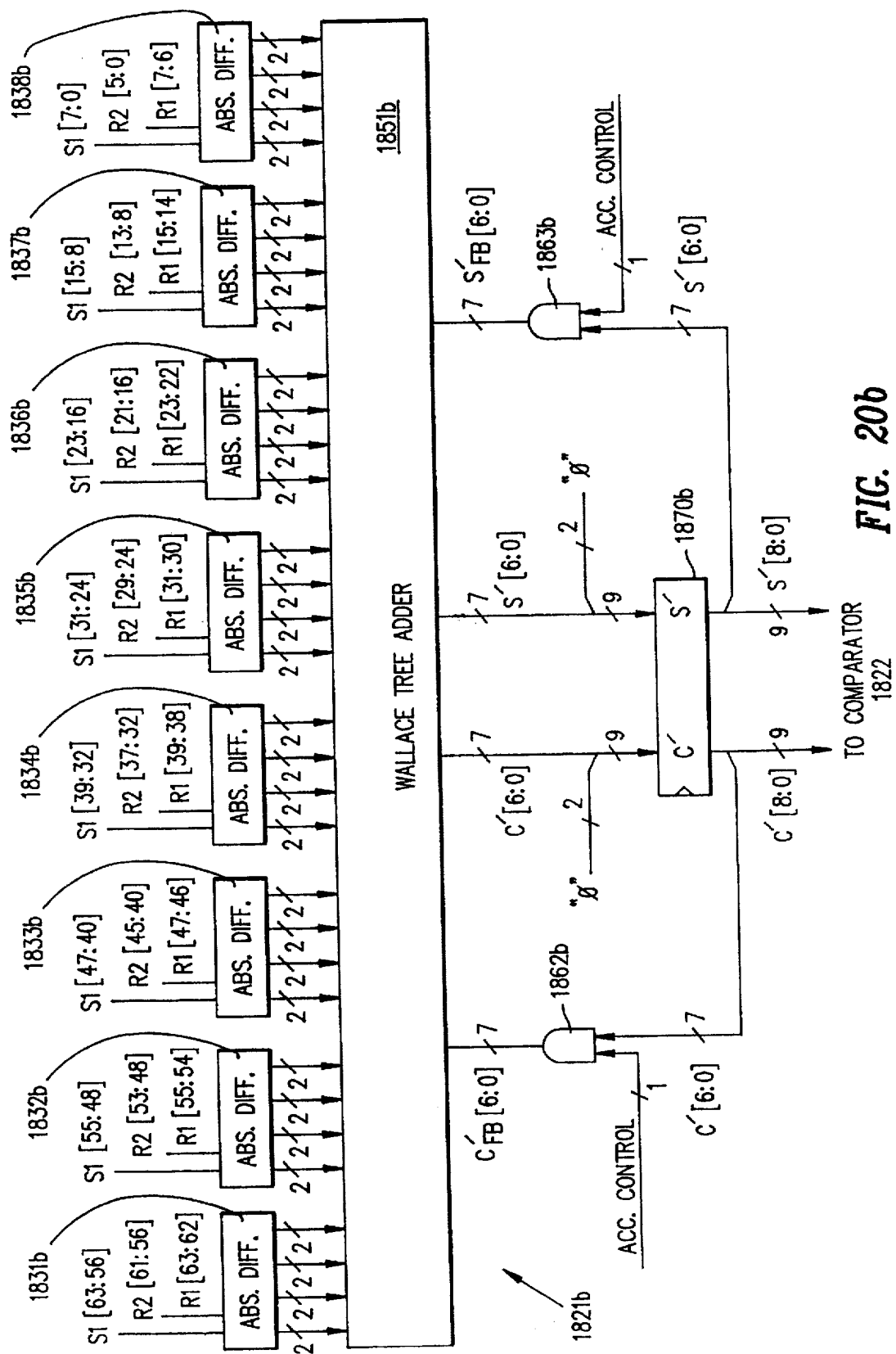
Figure 20C:
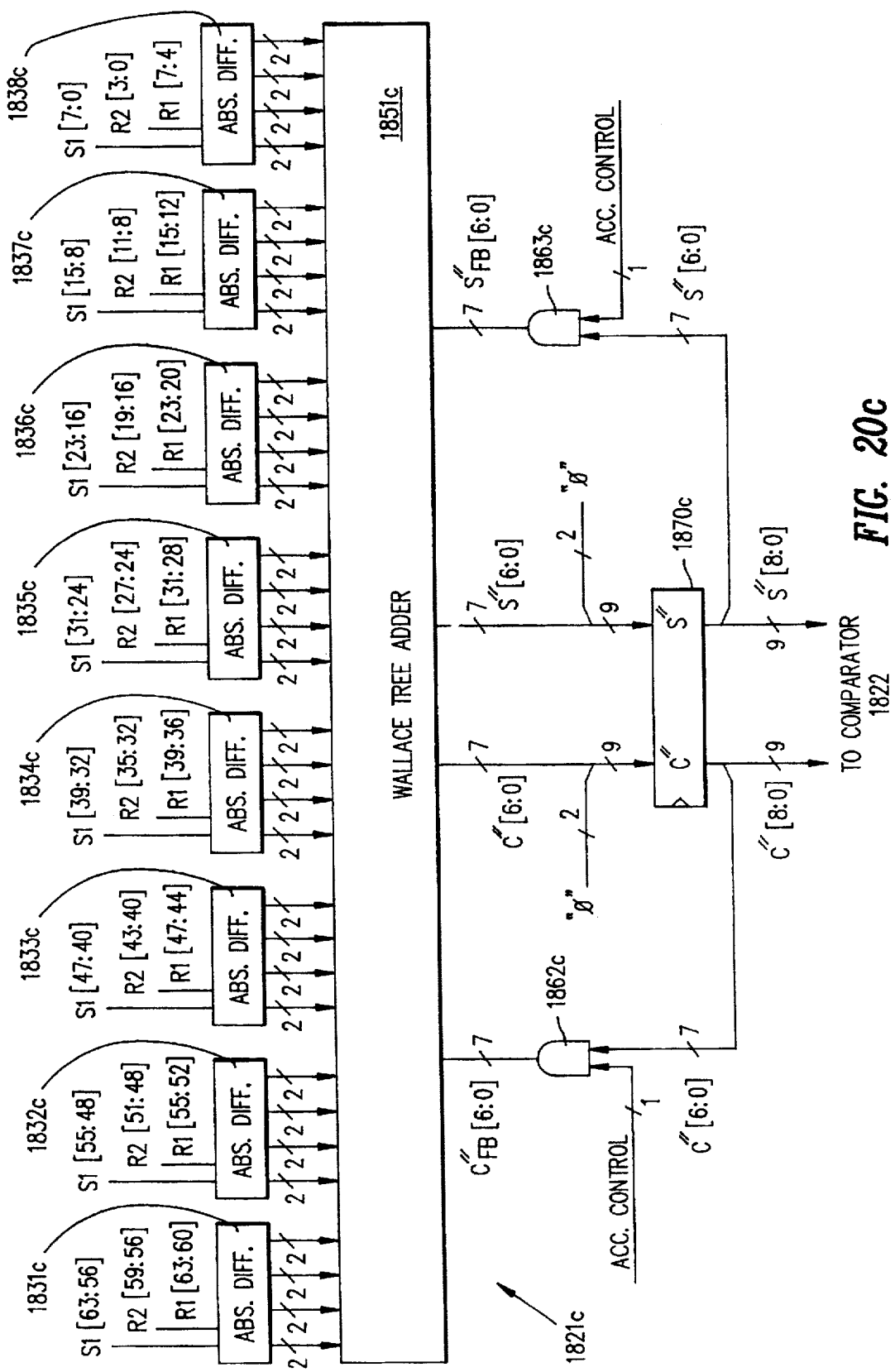
Figure 20D:
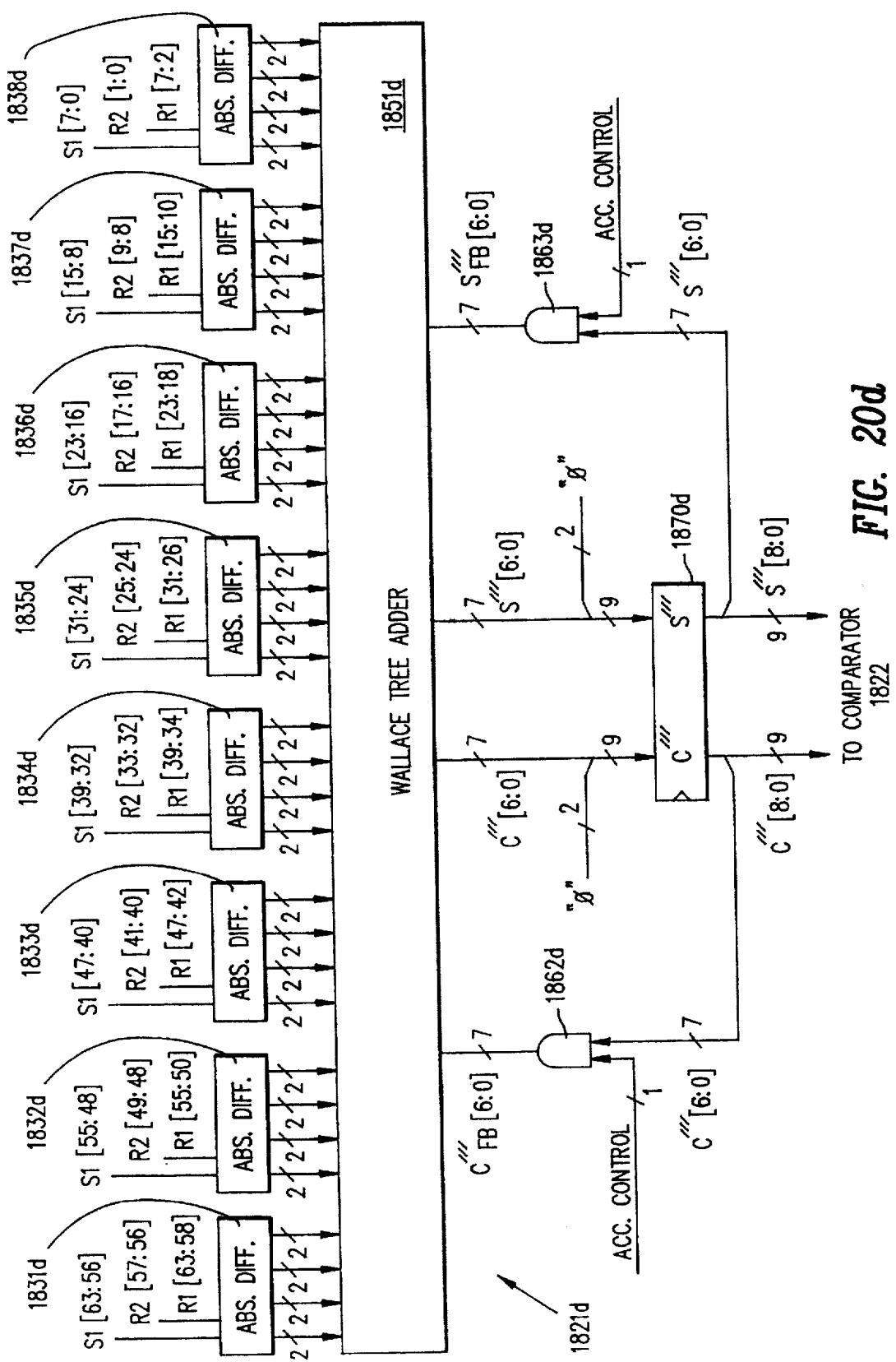

FIG. 19 is a block diagram which illustrates circuit 1800 used to compare current block 1501 with the search blocks within search window 1601. Circuit 1800 includes 4 Port SRAM memory 1801, SRAM register 1802, shifter 1803, offset register 1804, shifter register 1805, instruction register 1806, delay circuit 1810, delay register 1812, sum of differences circuit 1820, current score registers 1870a–1870d, comparator circuit 1822, difference registers 1880a–1880d, update circuit 1823 and best score registers 1890a–1890d.

The 64-bit words representing half blocks A, B and C-FF are stored in four port SRAM 1801. Table 4 illustrates the contents of the various registers of Circuit 1800 during the first 15 clock cycles (i.e., during the first vertical pass through search window 1601).

TABLE 4

| Cycle | S3 | S2 | S1 | R1 | R2 | cs | d | b |
|---|---|---|---|---|---|---|---|---|
| 1 | C | I | — | | | | | |
| 2 | D | J | — | C | | | | |
| 3 | E | K | A | D | C | | | |
| 4 | — | — | B | E | D | ACD | | |
| 5 | F | L | A | E | D | ACD+BDE | | |
| 6 | — | — | B | F | E | ADE | d CDE | |
| 7 | G | M | A | F | E | ADE+BEF | | b CDE |
| 8 | — | — | B | G | F | AEF | d DEF | |
| 9 | H | N | A | G | F | AEF+BFG | | b DEF |
| 10 | — | — | B | H | G | AFG | d EFG | |
| 11 | — | — | A | H | G | AFG+BGH | | b EFG |
| 12 | C | I | B | — | H | AG | d FGH | |
| 13 | D | J | — | (CI) | — | AG+BH | | b FGH |
| 14 | E | K | A | (DJ) | (CI) | — | d GH | |
| 15 | — | — | B | (EK) | (DJ) | A(CI) (DJ) | | b GH |

During a first clock cycle, the 64-bit words representing half blocks C and I (i.e. C[63:0] and I[63:0]) are addressed within SRAM 1801 and written to locations S3 and S2, respectively, of SRAM register using conventional techniques.

During a second clock cycle, the 64-bit words representing half blocks C and I are provided to shifter 1803. During the first vertical pass through search window 1601, only the 64-bit word representing half block C (i.e. C[63:0]) is routed through shifter and stored in shifter register 1805. During subsequent vertical passes through the search window (e.g., after half blocks A and B are compared with half blocks G and H, respectively), shifter 1803 will introduce a one pixel horizontal offset by passing portions of C[63:0] and I[63:0] to shifter register 1805. For example, during the second vertical pass through search window 1601, shifter 1803 passes the seven rightmost columns of half block C (i.e., C[55:0]) and the leftmost column of half block I (i.e., I[63:56]) to shifter register 1805. This effectively shifts the search block horizontally by one pixel. The 64-bit value stored in shifter register 1805 is generically referred to as R1[63:0].

Shifter 1803 is controlled by offset register 1804. Shifter 1803 is more fully described in commonly owned, co-pending U.S. patent application, Ser. No. 08/235,379, by Steve Purcell, filed Aug. 3, 1994, which is herein incorporated by reference in its entirety.

Also during the second clock cycle, the 64-bit words representing half blocks D and J in search window 1601 are addressed within SRAM 1801 and stored in locations S3 and S2, respectively, of SRAM register 1802.

During a third clock cycle, the 64-bit word R1[63:0] stored in shifter register 1805 (i.e., C[63:0]) is routed through a conventional delay circuit 1810 and stored in delay register 1812. The 64-bit value stored in delay register 1812 is generically referred to as R2[63:0]. Also during the third clock cycle, the 64-bit word representing half block D (i.e., D[63:0]) is routed through shifter 1803 and stored in shifter register 1805 as R1[63:0]. Also during this clock cycle, the 64-bit words representing half blocks E, K and A are addressed in SRAM 1801 and stored in locations S3, S2 and S1, respectively, of SRAM register 1802. Thus, at the end of the third cycle, the 64-bit words representing half blocks C, D, and A are provided to sum of differences circuit 1820 by registers 1812, 1805 and 1802, respectively.

Sum of differences circuit 1820 is illustrated in more detail in FIGS. 20a–20d, 21, and 22a–22i. Sum of differences circuit 1820 includes four parallel, independent parallel score calculation (or scoring) circuits 1821a–1821d as illustrated in FIGS. 20a–20d, respectively. The 64-bit word stored in position S1 of SRAM register 1802 (i.e., S1[63:0]) is provided to each of these parallel scoring circuits 1821a–1821d. During the third clock cycle, this 64-bit word is A[63:0].

Scoring circuit 1821a also receives 64-bit word, R2[63:0], stored in register 1812. During the third clock cycle, this 64-bit word is C[63:0].

Scoring circuit 1821b, in addition to receiving S1[63:0], is also hardwired to receive the portion of R2[63:0] which represents the three lowermost rows of the half block stored in register 1812 (i.e., R2[61:56], R2[53:48], R2[45:40], R2[37:32], R2[29:24], R2[21:16], R2[13:8] and R2[5:0]) and the portion of R1[63:0] which represents the uppermost row of the half block stored in register 1805 (i.e., R1[63:62], R1[55:54], R1[47:46], R1[39:38], R1[31:30], R1[23:22], R1[15:14] and R1[7:6]). During the third clock cycle, scoring circuit 1821b receives a 64-bit word which corresponds to half block C' (FIG. 18).

Scoring circuit 1821c, in addition to receiving S1[63:0], receives the portion of R2[63:0] which corresponds to the two lowermost rows of pixels of the half block stored in register 1812 (i.e., R2[59:56], R2[51:48], R2[43:40], R2[35:32], R2[27:24], R2[19:16], R2[11:8] and R2[3:0]). Scoring circuit 1821c also receives the portion of R1[63:0] which corresponds to the two uppermost rows of pixels of the half block stored in that register 1805 (i.e., R1[63:60], R1[55:52], R1[47:44], R1[39:36], R1[31:28], R1[23:20], R1[15:12] and R1[7:4]). Thus, during the third clock cycle, scoring circuit 1821c receives a 64-bit word which corresponds to half block C" (FIG. 18).

Finally, scoring circuit 1821d, in addition to receiving S1[63:0], receives a portion of R2[63:0] which corresponds to the lowermost row of pixels of the half block stored in register 1812 (i.e., R2[57:56], R2[49:48], R2[41:40], R2[33:32], R2[25:24], R2[17:16], R2[9:8] and R2[1:0]) and also receives a portion of R1[63:0] which corresponds to the three uppermost rows of pixels of the half block stored in register 1805 (i.e., R1[63:58], R1[55:50], R1[47:42], R1[39:34], R1[31:26], R1[23:18], R1[15:10] and R1[7:2]). Thus, during the third clock cycle, scoring circuit 1821c receives a 64-bit word which corresponds to half block C'" (FIG. 18). The comparison of half block A with each of half blocks C, C', C" and C'" (FIG. 18) thereby proceeds in parallel within scoring circuits 1821a, 1821b, 1821c and 1821d, respectively, during the third clock cycle. The operation of scoring circuit 1821a is described below. The operation of scoring circuits 1821b–1821d proceeds in substantially the same manner as scoring circuit 1821a.

Figure 21:
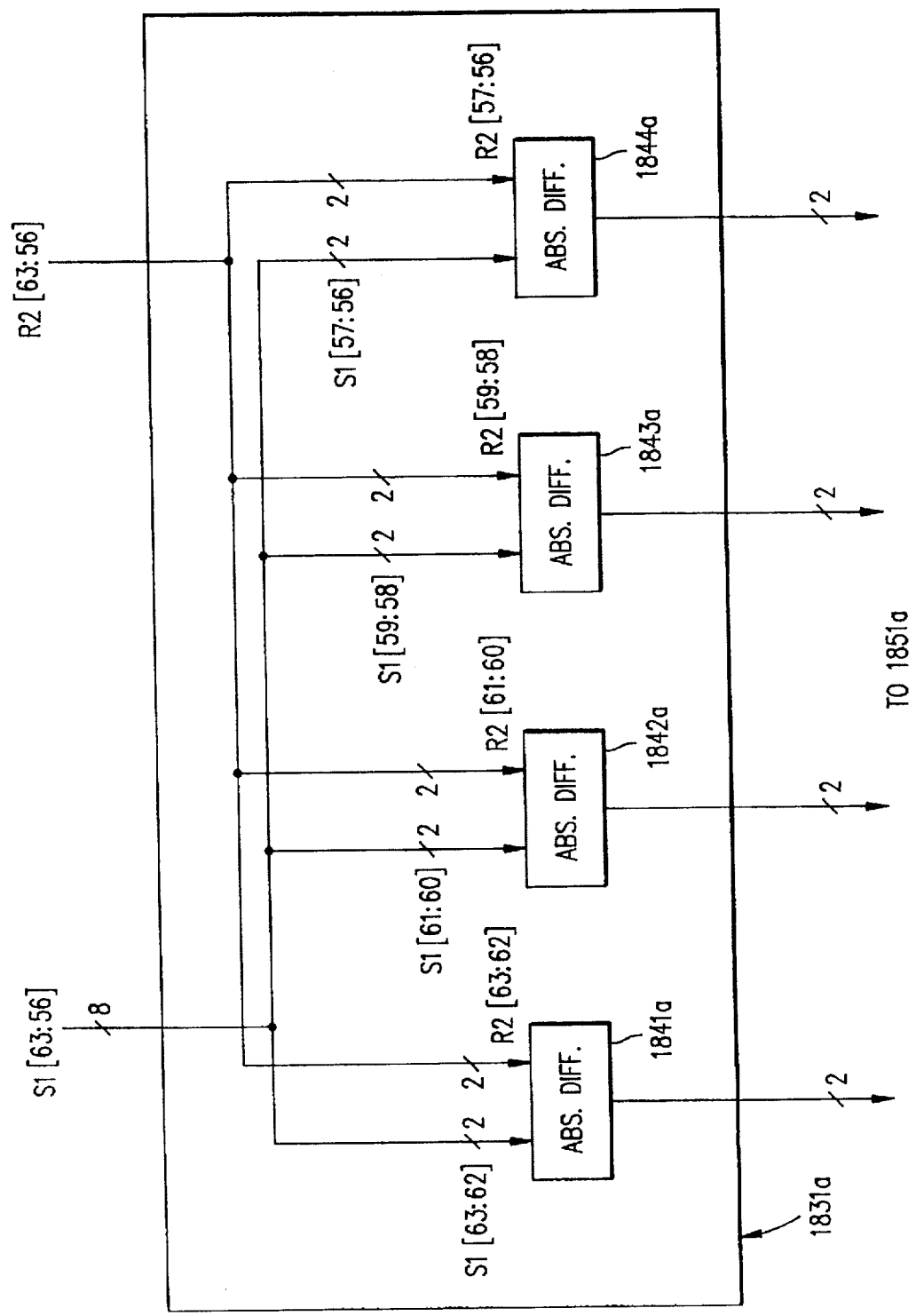
FIG. 21 is a block diagram illustrating an absolute difference block included in the scoring circuits of FIGS. 20a-20d.

Turning now to scoring circuit 1821a (FIG. 20a), words S1[63:0] and R2[63:0] are provided to absolute difference blocks 1831a–1838a. FIG. 21 is a block diagram illustrating absolute difference block 1831a. Absolute difference blocks 1832a–1838a (FIG. 20a), 1831b–1838b (FIG. 20b), 1831c–1838c (FIG. 20c), and 1831d–1838d (FIG. 20d) are identical to absolute difference block 1831a in this embodiment of the present invention. Absolute difference block 1831a includes four 2-bit absolute difference circuits 1841a–1844a.

Each absolute difference circuit 1841a–1844a receives two bits (i.e., one pixel intensity value) from each of 64-bit words S1[63:0] and R2[63:0] as illustrated. For example, absolute difference circuit 1841a receives S1[63:62] and R2[63:62] and compares these values to provide a 2-bit output equal to the absolute difference between these two values. Absolute difference circuits 1841a–1844a are conventional circuits which can be implemented in a number of different ways.

15

In this manner, absolute different blocks 1831a–1838a provide 32 2-bit values to Wallace tree adder circuit 1851a. These 32 2-bit differences are the absolute differences between the pixel intensity values of the half blocks represented by S1[63:0] and R2[63:0]. Thus, during the third clock cycle, these 32 2-bit differences represent the absolute differences between the pixel intensity values of half block A and half block C. Wallace tree adder circuit 1851a adds the 32 2-bit absolute differences to create a 7-bit carry signal c[6:0] and 7-bit save signal s[6:0].

FIG. 22a is a block diagram illustrating Wallace tree adder 1851a. In the embodiment illustrated, Wallace tree adders 1851b (FIG. 20b), 1851c (FIG. 20c), and 1851d (FIG. 20d) are identical to Wallace tree adder 1851a.

Figures 22B, 22C:
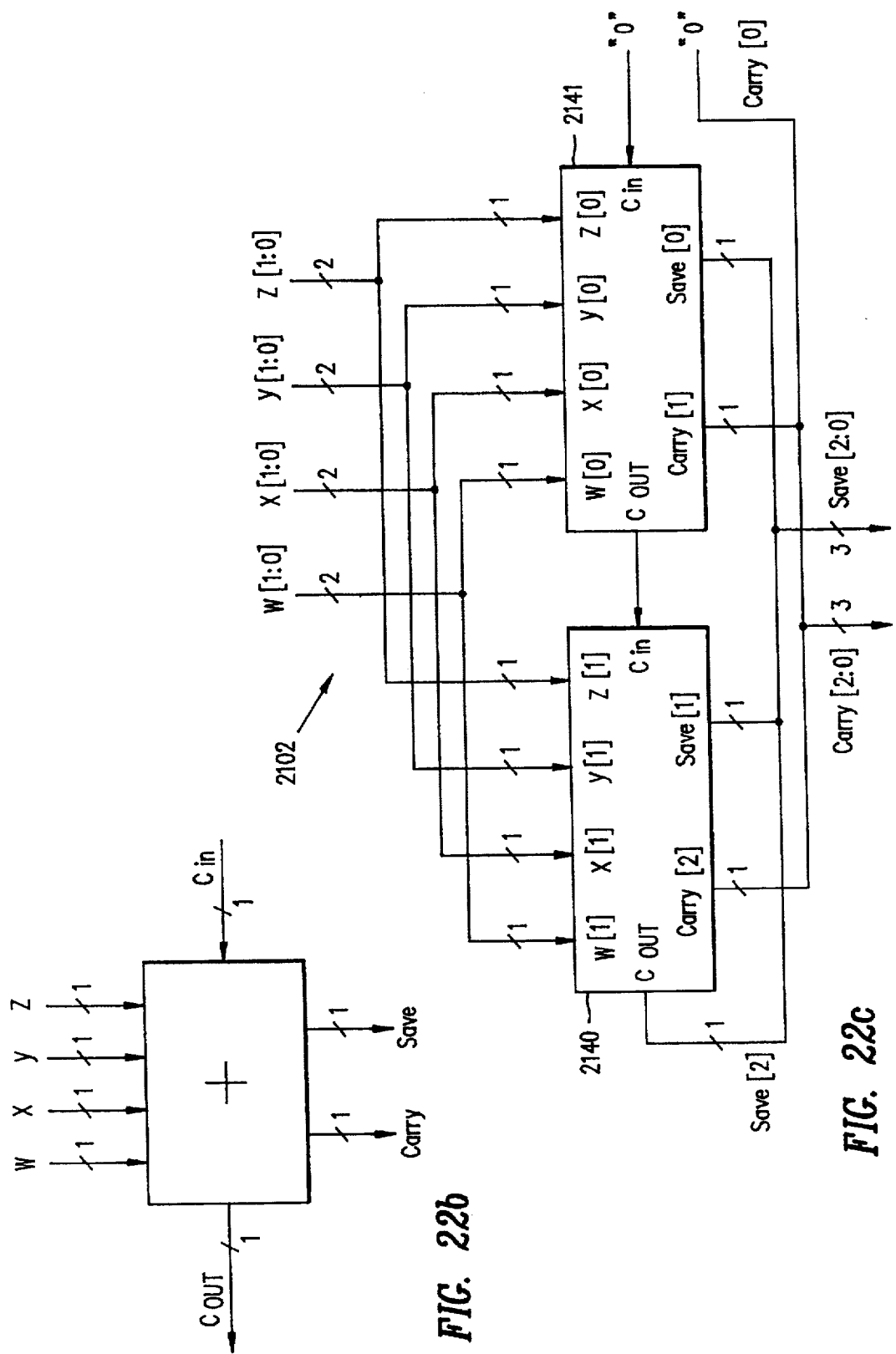

Wallace tree adder 1851a includes first-level adder blocks 2101–2108, second-level adder blocks 2111–2114, third-level adder blocks 2121–2122 and fourth-level adder block 2131. FIGS. 22c–22i are block diagrams illustrating the first, second, third and fourth level adder blocks in more detail. Because the block diagrams of FIGS. 22c–22i may represent more than one adder block in wallace tree adder circuit 1851, the input signals in these figures are generically referred to as w, x, y and z and the output signals are generically referred to as Carry and Save. FIG. 22b is a schematic diagram of a conventional four-to-two adder block 2110 which is used the basic logical building block in FIGS. 22c–22i. Table 5 is a truth table of four-to-two adder block 2110.

TABLE 5

| | | | | | $C_{IN}=0$ | | $C_{IN}=1$ | |
|---|---|---|---|---|---|---|---|---|
| w | x | y | z | $C_{OUT}$=wx+yz | Carry | Save | Carry | Save |
| 0 | 0 | 0 | 0 | 0 | 0 | 0 | 0 | 1 |
| 0 | 0 | 0 | 1 | 0 | 0 | 1 | 1 | 0 |
| 0 | 0 | 1 | 0 | 0 | 0 | 1 | 1 | 0 |
| 0 | 0 | 1 | 1 | 1 | 0 | 0 | 0 | 1 |
| 0 | 1 | 0 | 0 | 0 | 0 | 1 | 1 | 0 |
| 0 | 1 | 0 | 1 | 0 | 1 | 0 | 1 | 1 |
| 0 | 1 | 1 | 0 | 0 | 1 | 0 | 1 | 1 |
| 0 | 1 | 1 | 1 | 1 | 0 | 1 | 1 | 0 |
| 1 | 0 | 0 | 0 | 0 | 0 | 1 | 1 | 0 |
| 1 | 0 | 0 | 1 | 0 | 1 | 0 | 1 | 1 |
| 1 | 0 | 1 | 0 | 0 | 1 | 0 | 1 | 1 |
| 1 | 0 | 1 | 1 | 1 | 0 | 1 | 1 | 0 |
| 1 | 1 | 0 | 0 | 1 | 0 | 0 | 0 | 1 |
| 1 | 1 | 0 | 1 | 1 | 0 | 1 | 1 | 0 |
| 1 | 1 | 1 | 0 | 1 | 0 | 1 | 1 | 0 |
| 1 | 1 | 1 | 1 | 1 | 1 | 0 | 1 | 1 |

FIG. 22c is a block diagram of adder block 2102, which includes 4-to-2 adder blocks 2140 and 2141. In the embodiment illustrated in FIG. 22a, adder blocks 2103–2108 are identical to adder block 2102. As previously described, the input signals provided to 4-to-2 adder blocks 2140 and 2141 are generically shown as w, x, y and z and the output signals are generically shown as Carry and Save. Adder blocks 2102–2108 receive four 2-bit input signals and produce two 3-bit output signals.

Figure 22D:
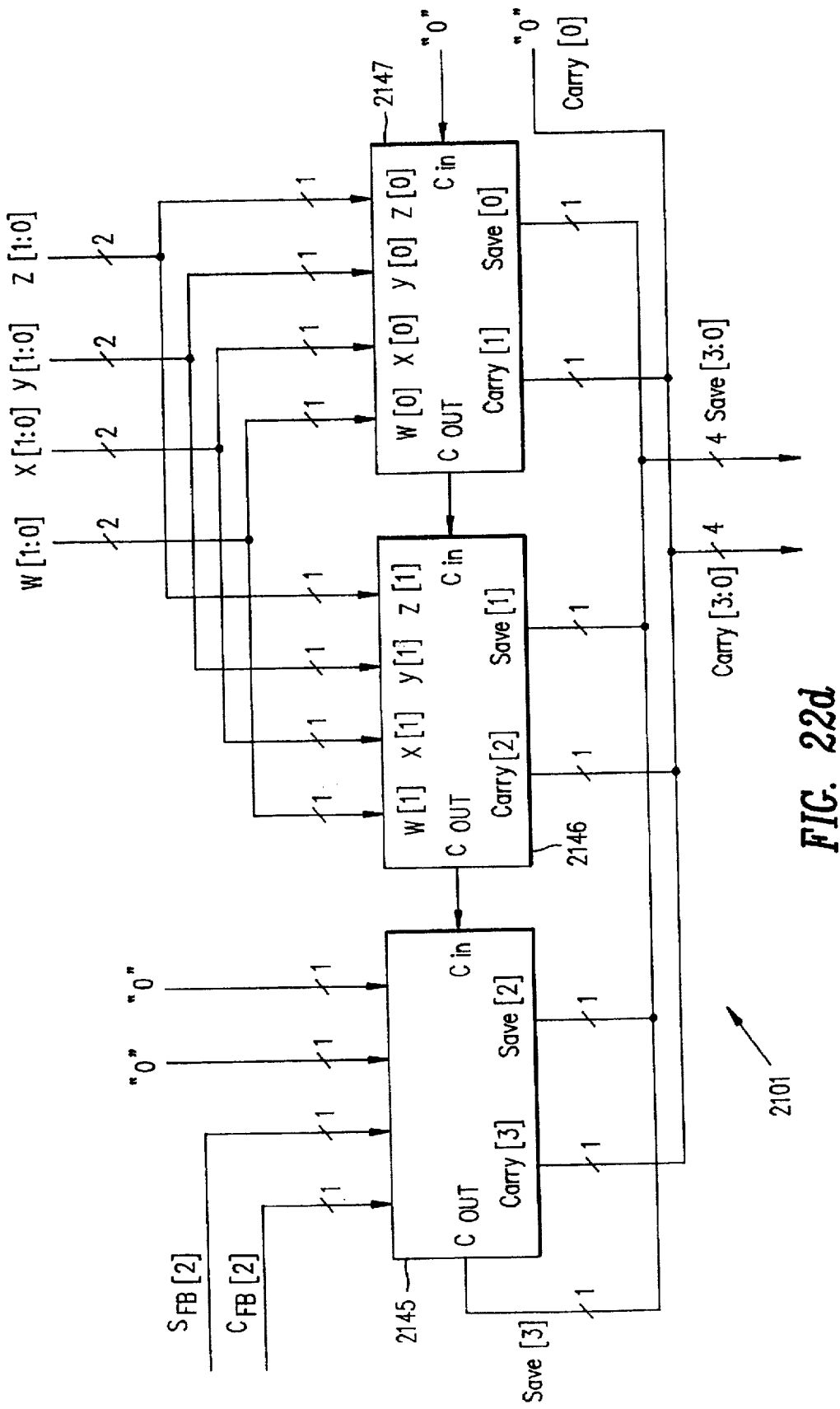

FIG. 22d is a block diagram of adder block 2101, which includes 4-to-2 adder blocks 2145–2147. Four-to-two adder block 2145 receives $S_{FB}[2]$ and $C_{FB}[2]$, which are save and carry feedback signals described in more detail below. Adder block 2101 receives four 2-bit input signals and two 1-bit feedback signals and produces two 4-bit output signals.

Figure 22E:
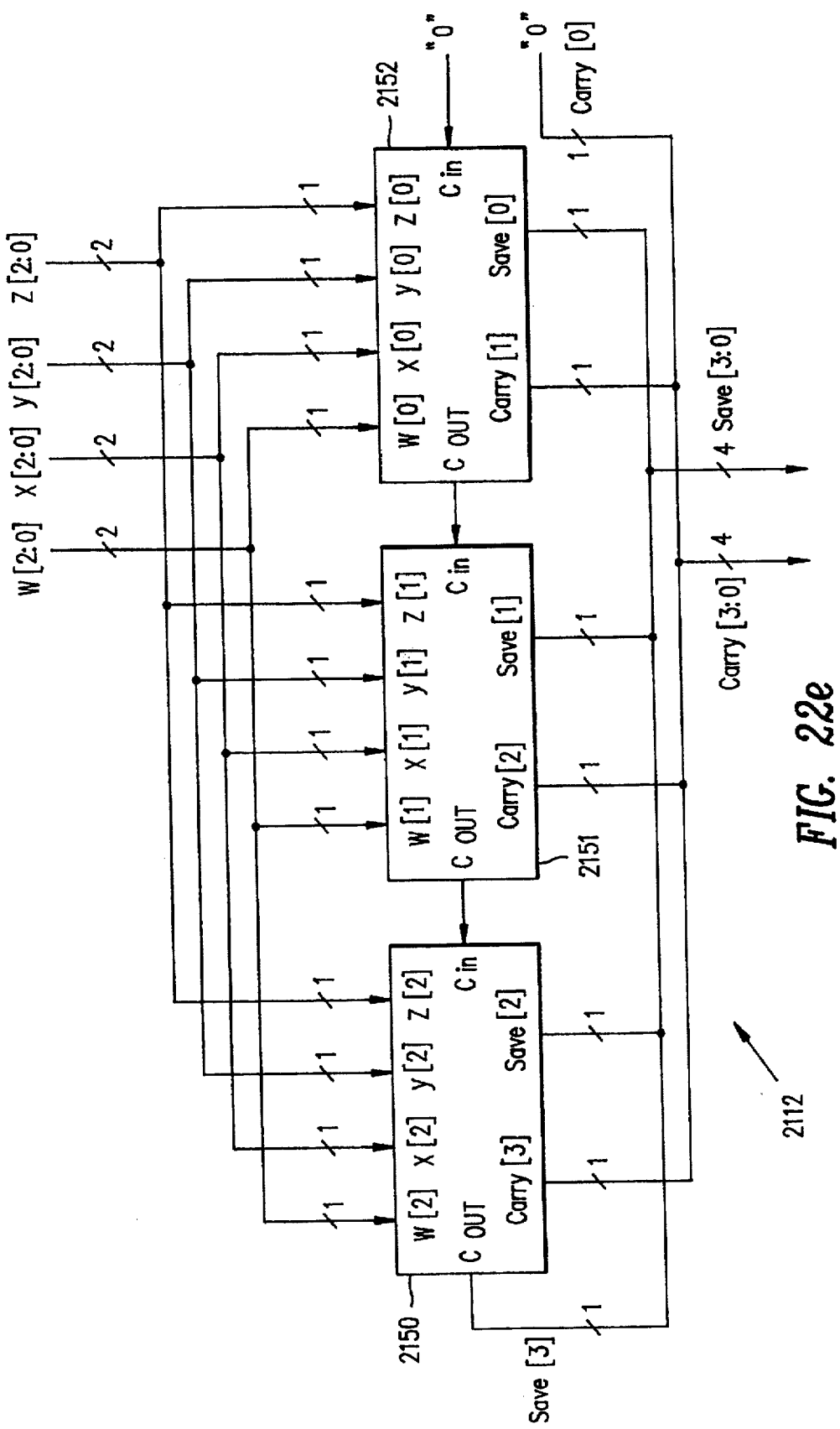

FIG. 22e is a block diagram of adder block 2112, which includes 4-to-2 adder blocks 2150–2152. In the embodiment illustrated, adder block 2112 is identical to adder blocks 2113–2114. Adder block 2112 receives four 3-bit input signals and produces two 4-bit output signals.

16

Figure 22F:
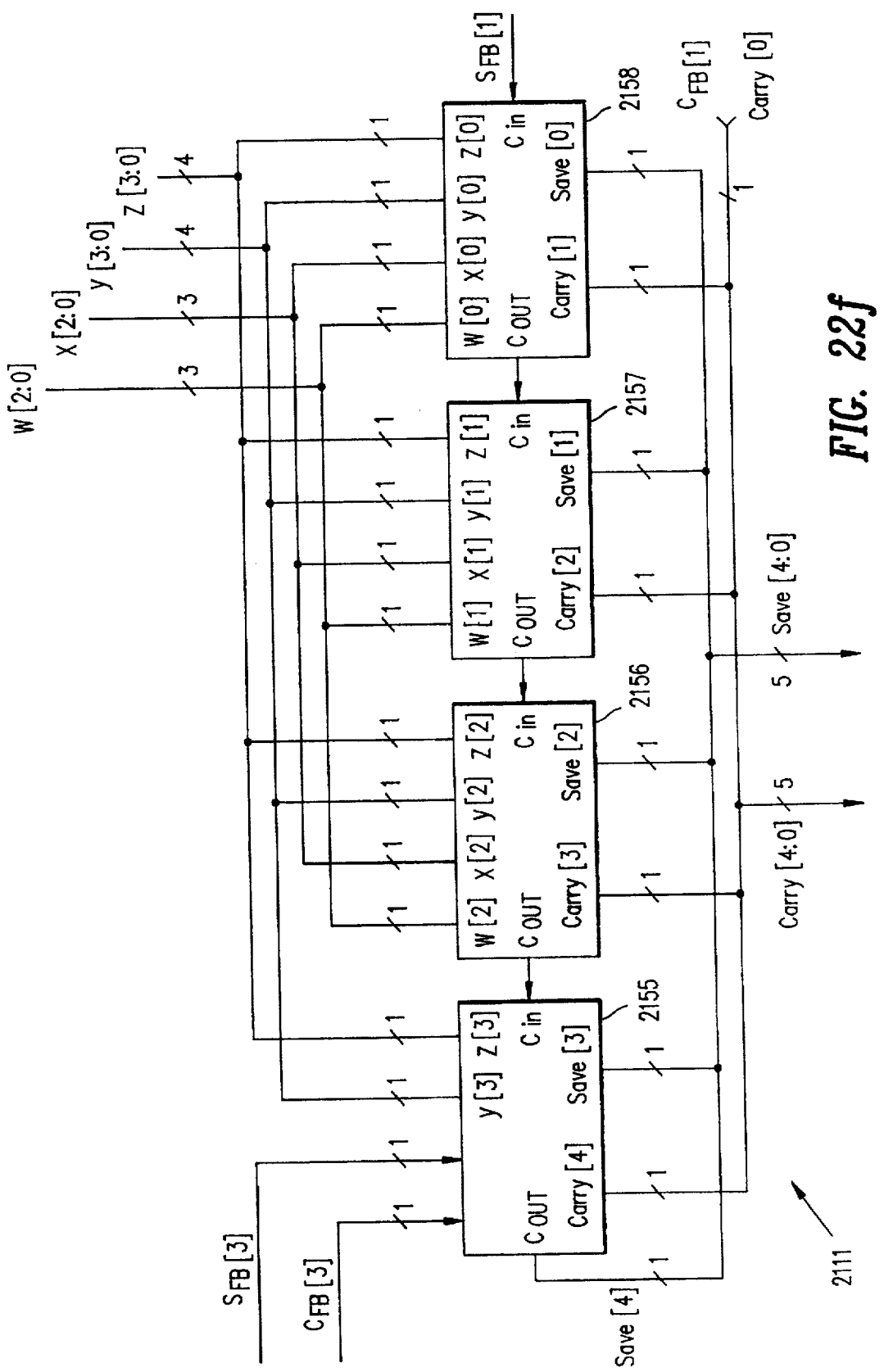

FIG. 22f is a block diagram of adder block 2111, which includes 4-to-2 adder blocks 2155–2159. Adder block 2111 receives $S_{FB}[3]$ and $C_{FB}[3]$ (at 4-to-2 adder block 2155), $S_{FB}[1]$ (at the Cin terminal of 4-to-1 adder block 2158) and $C_{FB}[1]$ (at the least significant bit position of the Carry signal). $S_{FB}[3]$, $C_{FB}[3]$, $S_{FB}[1]$ and $C_{FB}[1]$ are save and carry feedback signals described in more detail below. Adder block 2111 receives two 3-bit input signals, two 4-bit input signals and four 1-bit feedback signals and provides two 5-bit output signals.

Figure 22G:
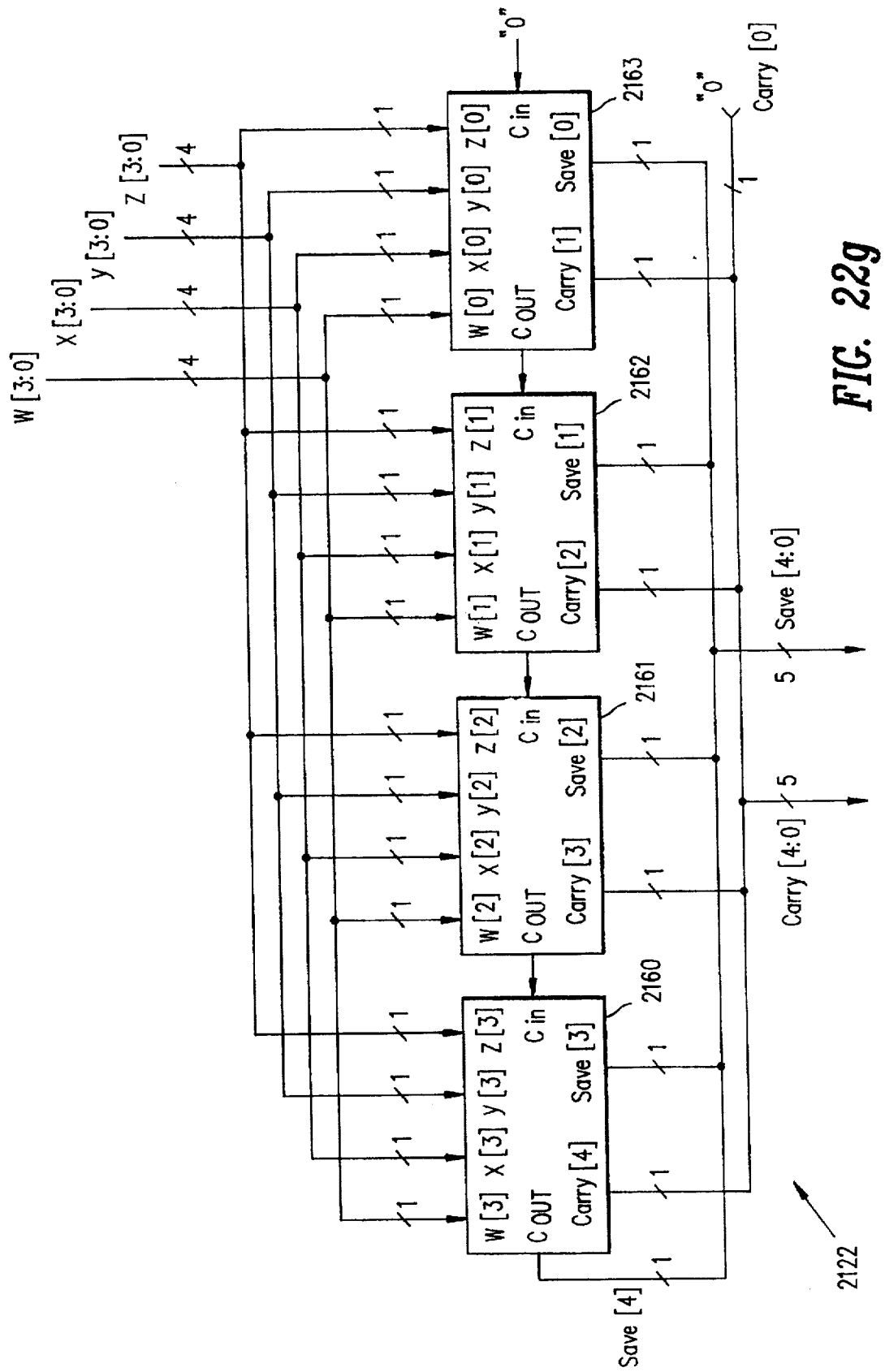

FIG. 22g is a block diagram of adder block 2122, which includes 4-to-2 adder blocks 2160–2163. Adder blocks 2122 receives four 4-bit input signals and provides two 5-bit output signals.

Figures 1, 22H:
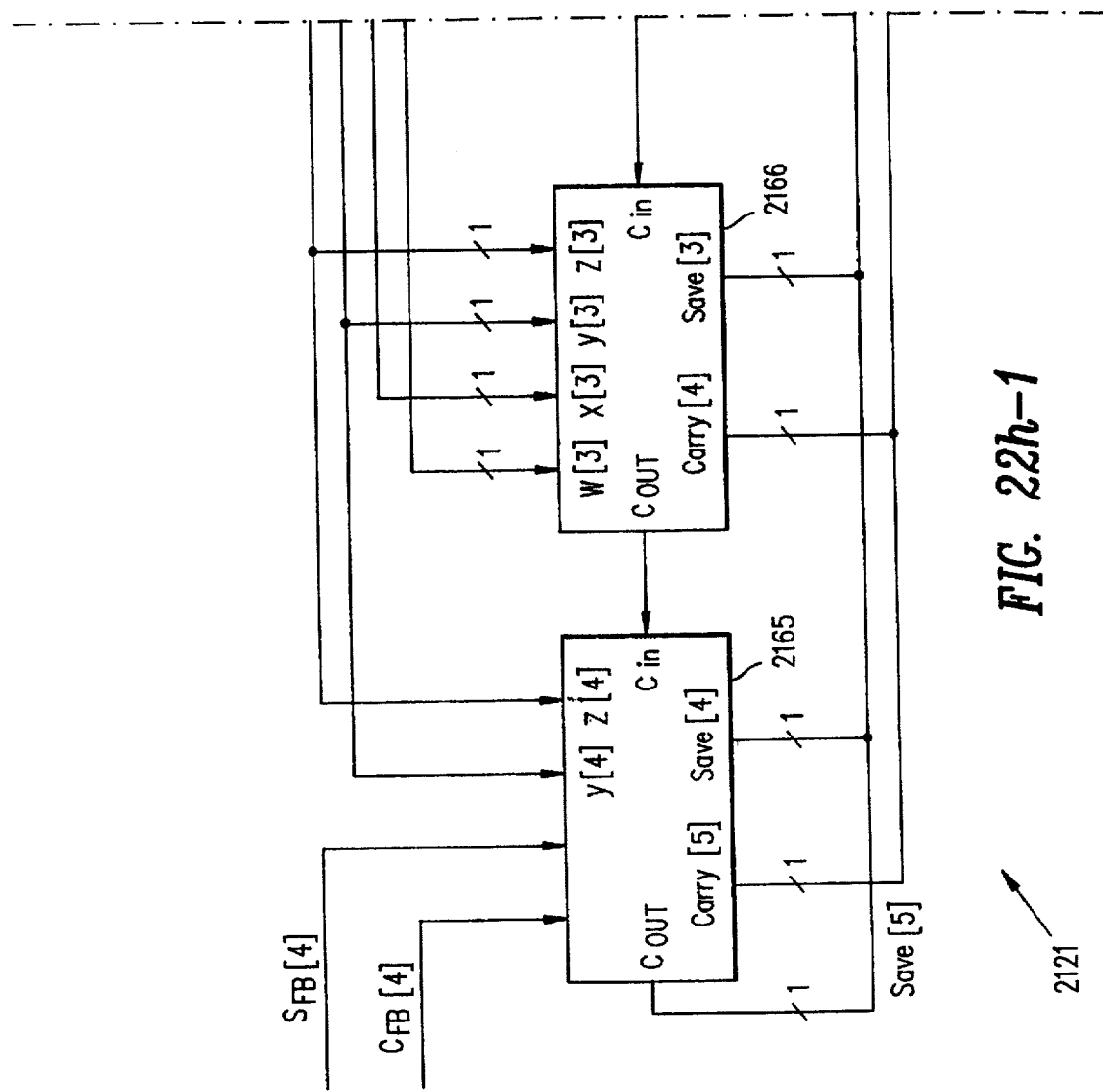
Figure 22H:
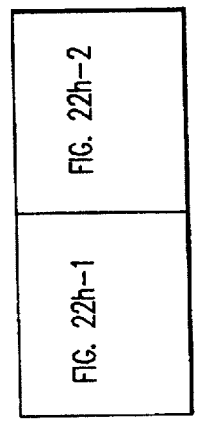
Figures 2, 22H:
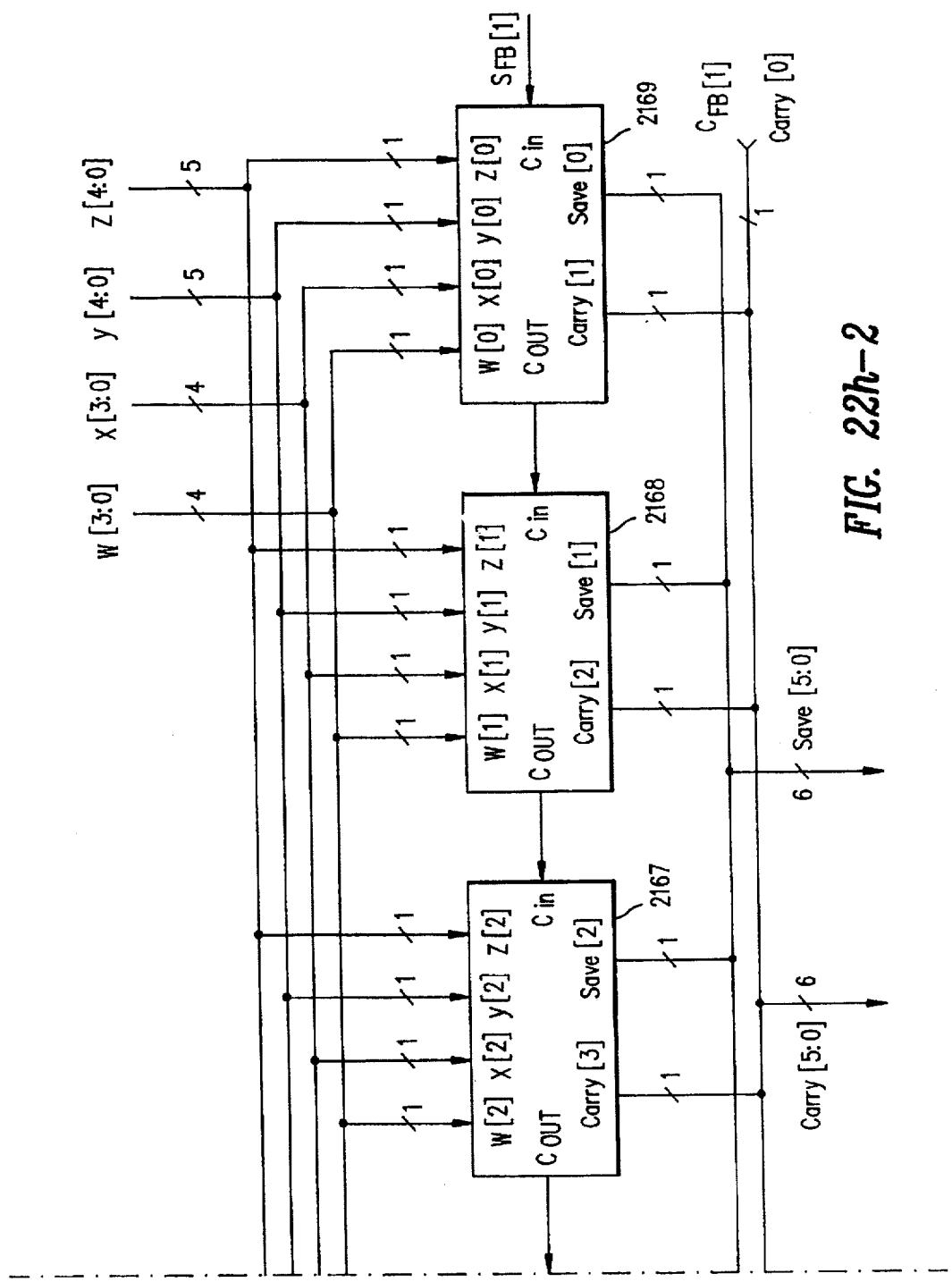

FIG. 22h is a block diagram of adder block 2121, which includes 4-to-2 adder blocks 2165–2169. Adder block 2121 receives $S_{FB}[4]$ and $C_{FB}[4]$ (at 4-to-2 adder block 2165), $S_{FB}[1]$ (at the Cin terminal of 4-to-1 adder block 2169) and $C_{FB}[1]$ (at the least significant bit position of the Carry signal). $S_{FB}[4]$, $C_{FB}[4]$, $S_{FB}[1]$ and $C_{FB}[1]$ are save and carry feedback signals described in more detail below. Adder block 2121 receives two 4-bit input signals, two 5-bit input signals and four 1-bit feedback signals and produces two 6-bit output signals.

Figures 2, 22I:
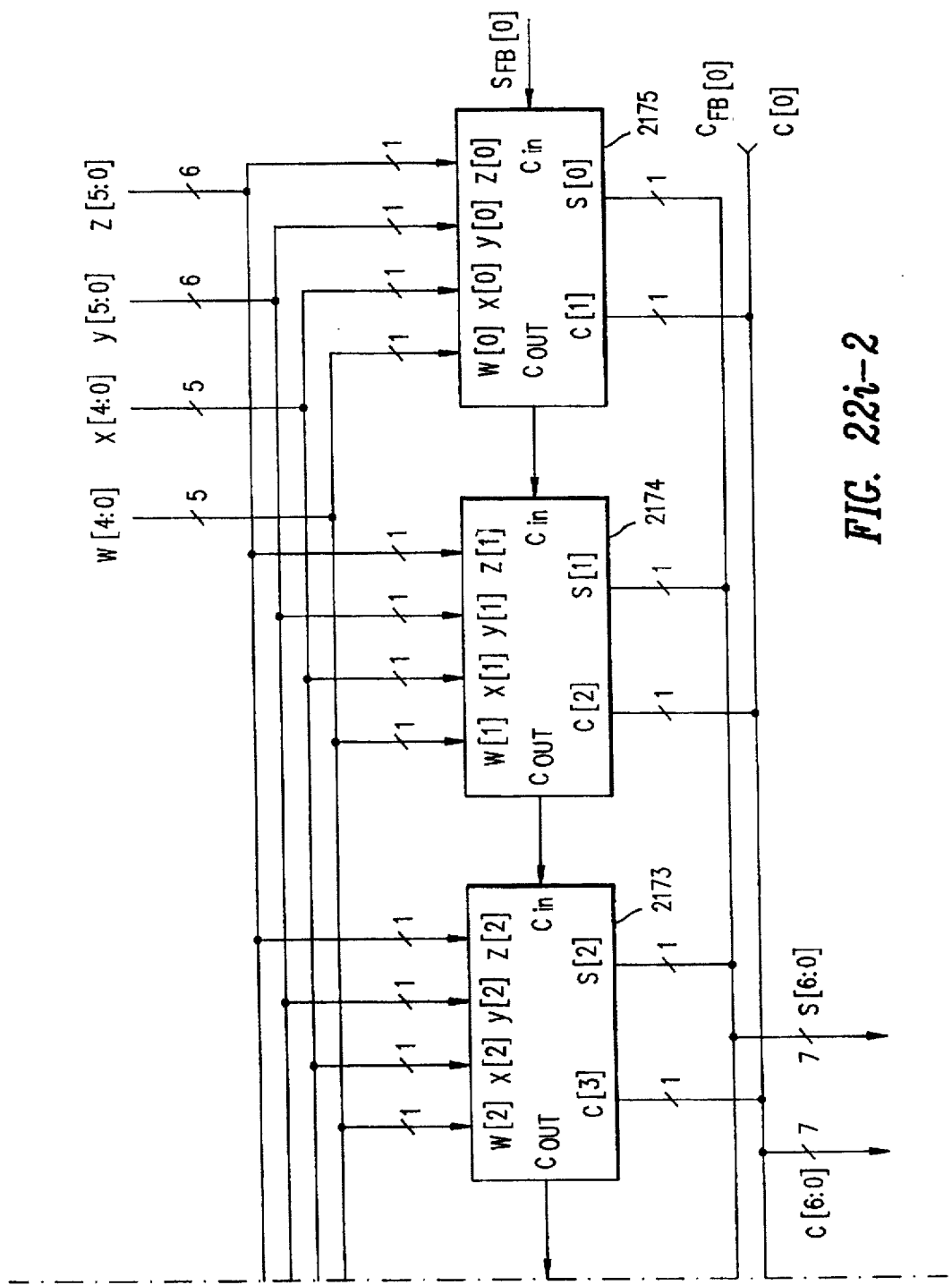

FIG. 22i is a block diagram of adder block 2131, which includes 4-to-2 adder blocks 2170–2175. Adder block 2131 receives $S_{FB}[5]$ and $C_{FB}[5]$ (at 4-to-2 adder block 2170), $S_{FB}[0]$ (at the Cin terminal of 4-to-1 adder block 2175) and $C_{FB}[0]$ (at the least significant bit position of the Carry signal). $S_{FB}[5]$, $C_{FB}[5]$, $S_{FB}[0]$ and $C_{FB}[0]$ are save and carry feedback signals described in more detail below. Adder block 2131 receives two 5-bit input signals, two 6-bit input signals and four 1-bit feedback signals and produces a 7-bit carry signal, c[6:0], and a 7-bit save signal, s[6:0]. Although Wallace tree adder circuits 1851a–1851d have been described in connection with a particular circuit, it is understood that other circuits could be also be used.

During the fourth clock cycle, the carry signal c[6:0] and the save signal s[6:0] from Wallace tree adder are concatenated with two "0" bits at the most significant bit positions, thereby creating 9-bit carry signal c[8:0] and 9-bit save signal s[8:0], wherein bits c[8:7] and s[8:7] are "0" bits. These 9-bit signals are stored in 18-bit carry-save register 1870a. Because these carry and save signals only represent a half block comparison (e.g., half block A with half block C), these values are held in carry-save register 1870a until the results of the next half block comparison are complete. This condition is identified as ACD in the "cs" column of Table 4.

During the fourth clock cycle, the values S1[63:0] and R2[63:0] provided to scoring circuit 1821a correspond to half blocks B (FIG. 16) and D (FIG. 17) (See also, Table 1). Also, during the fourth clock cycle, a logic high accumulator control signal is provided to AND gates 1862a and 1863a, thereby providing carry signal c[6:0] and save signal s[6:0] stored in carry-save register 1870a to Wallace tree adder 1851a as carry feedback signal $C_{FB}[6:0]$ and save feedback signal $S_{FB}[6:0]$. This allows the results of the first half block comparison to be added to the results of the second half block comparison. Therefore, during the fifth clock cycle, the output of Wallace tree adder 1851a is representative of a full block comparison (e.g., half block A compared with half block C and half block B compared to half block D). The results of this full block comparison are referred to as a "current score". A low current score represents a close match between the current block and the search block.

Processing within scoring circuits 1821b–1821d proceeds in the manner substantially described above in connection with scoring circuit 1821a. Thus, during the third clock cycle, scoring circuit 1821b processes half blocks A and C', scoring circuit 1821c processes half blocks A and C" and scoring circuit 1821d processes half blocks A and C'". Similarly, during the fourth clock cycle, scoring circuit 1821b processes half blocks B and D', scoring circuit 1821c processes half blocks B and D" and scoring circuit 1821d processes half blocks B and D'".

Figure 23:
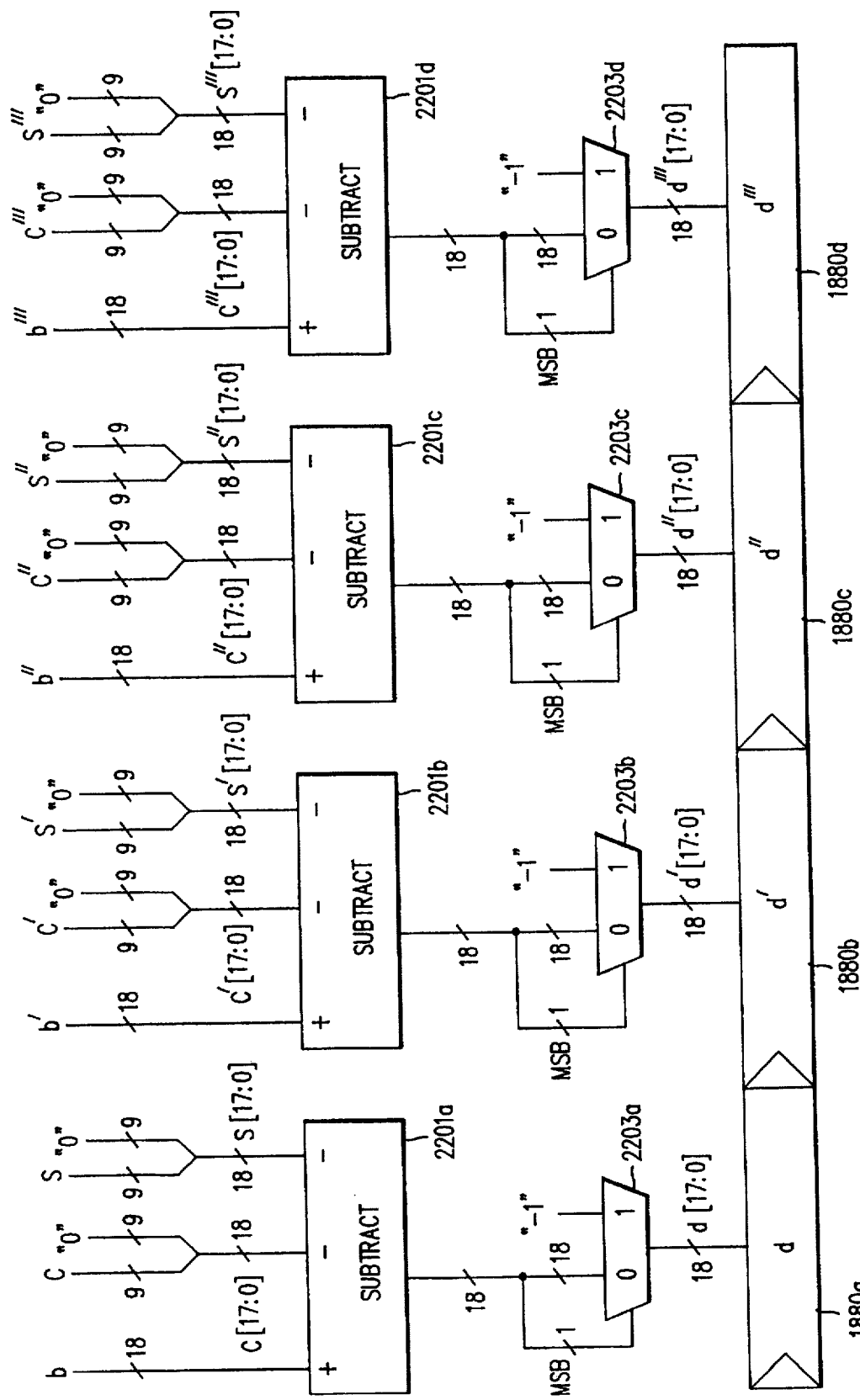
FIG. 23 is a block diagram of a comparator block used in the circuitry of FIG. 19.

The 9-bit carry and save signals from current score registers 1870a–1870d are provided to comparator block 1822. FIG. 23 is a block diagram of comparator block 1822. The 9-bit carry and save signals (e.g., c[8:0] and s[8:0]) are each concatenated with nine zero bits at the least significant bit positions, thereby creating 18-bit carry and save signals (e.g., carry signal c[17:0] and 18-bit save signal s[17:0]). These 18-bit carry and save signals are provided to the subtrahend input terminals of 3-input subtraction circuits 2201a–2201d as illustrated. Three-input subtraction circuits 2201a–2201d provide increased speed when compared with the use separate adder and subtraction circuits. The minuend input terminals of subtraction circuits 2201a, 2201b, 2201c and 2201d receive 18-bit best scores b[17:0], b'[17:0], b"[17:0] and b'"[17:0], respectively from update circuit 1823 (FIG. 19). These best scores are the lowest previously detected current scores, which are updated by update circuit 1823 as described in more detail below. These best scores are initially set at maximum values (i.e., a "0" bit in the most significant bit position, followed by "1"s in the less significant bit positions in two's complement format). As described below, the 9 most significant bits of best scores b[17:0], b'[17:0], b"[17:0] and b'"[17:0] are used to store "score" information and the 9 least significant bits are used to store "count" information which indicates the number of cycles that have passed since the best score was detected.

The differences calculated by subtraction circuits 2201a–2201d are provided to multiplexers 2203a–2203d, respectively. As illustrated in FIG. 23, the most significant bits of the output signals of subtraction circuits 2201a–2201d are used to control multiplexers 2203a–2203d.

For example, if best score b[17:0] is less than current score represented by c[17:0] and s[17:0], then the most significant bit of the difference between these scores is a logic "1" value. Under these circumstances, the best score b[17:0] is not updated. Thus, if the most significant bit provided by subtraction circuit 2201a is a "1" value, multiplexer 2203a passes a minus one value to difference register 1880a. As a result, d[17:0] becomes minus one.

Conversely, if best score b[17:0] is greater than current score represented by c[17:0] and s[17:0], the most significant bit of difference d[17:0] is a zero value. Under these conditions, the most significant bit provided by subtraction circuit 2201a causes multiplexer 2203a to pass a value of d[17:0] which is equal to b[17:0]–c[17:0]–s[17:0] to difference register 1880a.

Multiplexers 2203b–2303d operate in a similar manner to provide d'[17:0], d"[17:0] and d'"[17:0] to difference registers 1880b, 1880c and 1880d, respectively.

Figure 24:
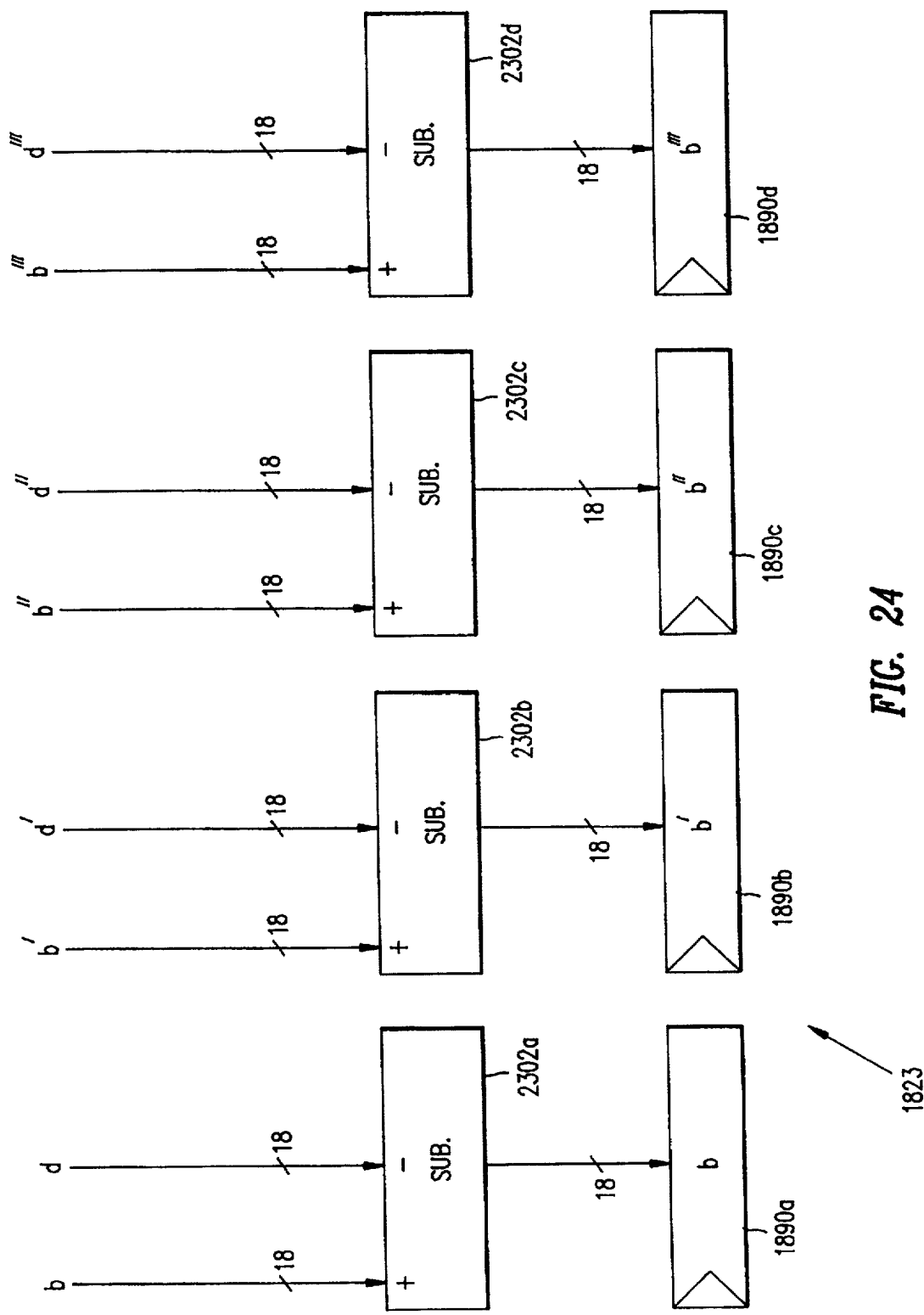
FIG. 24 is a block diagram of an update circuit used in the circuitry of FIG. 19.

FIG. 24 is a block diagram of update circuit 1823. Update circuit 1823 includes subtraction circuits 2302a–2302d. Best scores b[17:0], b'[17:0], b"[17:0] and b'"[17:0] are provided to the minuend input terminals of subtraction circuits 2302a, 2302b, 2302c and 2302d, respectively. The values stored in difference registers 1880a, 1880b, 1880c and 1880d d[17:0], d'[17:0], d"[17:0] and d'"[17:0], respectively are provided to the subtrahend input terminals of subtraction circuits 2302a, 2302b, 2302c and 2302d, respectively.

As previously discussed, if the best score b[17:0] is less than the current score represented by c[17:0] and s[17:0], the n difference register 1880a contains a minus one value. When this minus one value is subtracted from best score b[17:0], the upper nine bits of b[17:0] (i.e. the best score) remain unchanged and the lower nine bits of b[17:0] (i.e., the count) are incremented by one. In this manner, a count is maintained of the number of search blocks since the detection of the best score. Because the search pattern within the search window is fixed, this count defines the location of the search block corresponding to the best score at the completion of the comparison between the current block and the search window.

If the best score b[17:0] is greater than the current score represented by c[17:0] and s[17:0], the contents of difference register 1880a are equal to b[17:0]–c[17:0]–s[19:0]. When this value is subtracted from best score b[17:0] in subtraction circuit 2302a, the new best score transmitted to register 1890a is the current score c[17:0]+s[17:0] (i.e., b[17:0]–(b [17:0]–c[17:0]–s[17:0])). Because the lower nine bits of c[17:0]+s[17:0] are all zero values, the count is effectively reset.

After the current block has been compared with every possible search block within the search window, best score registers 1890a–1890d will each contain a best score (upper 9 bits) and a count which indicates the number of search blocks since the best score was detected (lower 9 bits). Thus, four best scores are obtained. Best score register 1890a contains the best score for search blocks positioned at rows 0, 4, 8, etc. Similarly, best score register 1890b holds the best scores for search blocks positioned at rows 1, 5, 9, etc. Best score register 1890c holds the best scores for search blocks positioned at rows 2, 6, 10, etc. Finally, best score register 1890d holds the best score for search blocks positioned at rows 3, 7, 11, etc. The count identifies the position of the search block corresponding to the best score. For example, if the count in register 1890a is twelve, then the best score in register 1890a occurred twelve search blocks (24 clock cycles) back from the final search block. Note that the search pattern must be known to identify this search block within the search window.

Although the invention has been described in connection with several embodiments, it is understood that this invention is not limited to the embodiments disclosed, but is capable of various modifications which would be apparent to one of ordinary skill in the art. Thus, the invention is limited only by the following claims.

We claim:

1. A method of approximating pixel intensity values of pixels in a current frame from pixel intensity values of pixels in a reference frame, said method comprising the steps of:

defining a current block which includes a subset of the pixels of the current frame;

defining a search window which includes a subset of the pixels of the reference frame;

thresholding the pixel intensity values of the pixels of the current block and the pixel intensity values of the pixels of the search window, thereby creating a thresholded current block and a thresholded search window.

2. The method of claim 1, wherein the thresholding step further comprises the steps of:

averaging the pixel intensity values of the pixels in the current block, thereby determining a first average pixel intensity value; and using the first average pixel intensity value to threshold the pixel intensity values of the pixels of the current block and the pixel intensity values of the pixels of the search window.

3. The method of claim 2, wherein said thresholding step further comprises the steps of:

assigning a first digital value to pixels in the current block and the search window which have a pixel intensity value less than the first average pixel intensity value; and assigning a second digital value to pixels in the current block and the search window which have a pixel intensity value greater than the first average pixel intensity value.

4. The method of claim 2, further comprising the steps of:

averaging the pixel intensity values of the pixels in the current block which have a pixel intensity value less than the first average pixel intensity value, thereby determining a second average pixel intensity value; and averaging the pixel intensity values of the pixels in the current block which have a pixel intensity value greater than the first average pixel intensity value, thereby determining a third average pixel intensity value;

wherein the thresholding step further comprises thresholding the pixel intensity values of the pixels of the current block and the pixel intensity values of the pixels of the search window using the second and third average pixel intensity values.

5. The method of claim 4, wherein the thresholding step comprises the steps of:

assigning a first digital value to pixels in the current block and the search window which have a pixel intensity value less than the second average pixel intensity value;

assigning a second digital value to pixels in the current block and the search window which have a pixel intensity value greater than the second average pixel intensity value and less than the first average pixel intensity value;

assigning a third digital value to pixels in the current block and the search window which have a pixel intensity value greater than the first average pixel intensity value and less than the third average pixel intensity value; and assigning a fourth digital value to pixels in the current block and the search window which have a pixel intensity value greater than the third average pixel intensity value.

6. The method of claim 2, further comprising the steps of:

defining a plurality of thresholded search blocks within the thresholded search window;

comparing the thresholded current block with each of the thresholded search blocks;

determining a plurality of optimal thresholded search blocks which most closely approximate the thresholded current block;

comparing the current block with non-thresholded search blocks which correspond to the optimal thresholded search blocks;

determining the non-thresholded search block which most closely approximates the current block; and using the non-thresholded search block which most closely approximates the current block to estimate the current block.

7. The method of claim 6, wherein the step of comparing the thresholded current block with each of the thresholded search blocks further comprises the step of determining the mean absolute difference between the thresholded current block and each of the thresholded search blocks; and wherein the step of comparing the current block with the non-thresholded search blocks further comprises the step of determining the mean absolute difference between the current block and each of the non-thresholded search blocks.

8. The method of claim 6, further comprising the steps of:

defining a second current block which includes a subset of the pixels of the current frame, wherein the pixels of the second current block are adjacent to the pixels of the current block;

comparing the second current block with a second search block adjacent to the non-thresholded search block used to estimate the current block;

determining whether a difference between the second current block and the second search block is less than a predetermined value; and using the second search block to estimate the second current block if the difference is less than the predetermined value.

9. The method of claim 2, further comprising the steps of:

defining a second current block which includes a subset of the pixels of the current frame;

defining a second search window which includes a subset of the pixels of the reference frame; and thresholding the pixel intensity values of the pixels of the second current block and the pixel intensity values of the pixels of the second search window using the first average pixel intensity value.

10. The method of claim 2, further comprising the step of performing block subsampling on the current block and the search window prior to the thresholding step.

11. The method of claim 2, further comprising the step of performing algorithmic subsampling within the search window after the thresholding step.

12. The method of claim 2, further comprising the step of hierarchically filtering the search window and current block prior to the thresholding step.

13. The method of claim 2, further comprising the steps of:

calculating the mean absolute difference between the pixel intensity values of the pixels in the current block and the first average pixel intensity value;

dividing the mean absolute difference by the number of pixels in the current block to obtain a range defining value;

subtracting the range defining value from the first average pixel intensity value to obtain a second average pixel intensity value; and adding the range defining value to the first average pixel intensity value to obtain a third average pixel intensity value, wherein the thresholding step further comprises thresholding the pixel intensity values of the pixels of the current block and the pixel intensity values of the pixels of the search window using the second and third average pixel intensity values.

14. The method of claim 1, wherein the thresholded current block and the thresholded search window comprise thresholded pixel intensity values which have a reduced precision with respect to the pixel intensity values of the pixels in the current block and the search window.

15. A circuit for comparing pixel intensity values of pixels in a current block to pixel intensity values of pixels in a reference block, said circuit comprising:

scoring means for comparing the pixel intensity values of pixels in the current and reference blocks to create a current score;

comparator means coupled to the scoring means, wherein the comparator means compares the current score to a previously determined best score; and update means coupled to the comparator means, wherein the update means replaces the best score with the current score and resets a counter if the current score is less than the best score, and wherein the update means retains the best score and increments the counter if the current score is greater than the best score.

16. A circuit for comparing pixel intensity values of pixels in a current block to pixel intensity values of pixels in a reference block, said circuit comprising:

a scoring circuit which calculates a current score equal to the sum of absolute differences between corresponding pixel intensity values in the current and reference blocks, wherein the current score is represented by a carry byte and a save byte;

a first concatenation circuit coupled to the scoring circuit, wherein the first concatenation circuit concatenates the carry byte with a plurality of zero bits to create a carry word having a most significant byte equal to the carry byte and a least significant byte equal to zero;

a second concatenation circuit coupled to the scoring circuit, wherein the second concatenation circuit concatenates the save byte with a plurality of zero bits to create a save word having a most significant byte equal to the save byte and a least significant byte equal to zero;

a first subtraction circuit coupled to the first and second concatenation circuits, wherein the first subtraction circuit subtracts the carry word and the save word from a best score word to create a difference word;

a multiplexer circuit coupled to the subtraction circuit, wherein the multiplexer circuit passes the difference word if the difference word is positive and wherein the multiplexer passes a preselected control word if the difference word is not positive;

a second subtraction circuit coupled to the multiplexer circuit, wherein the second subtraction circuit subtracts the word passed by the multiplexer circuit from the best score word to create an updated best score word.

17. The circuit of claim 16, wherein the scoring circuit comprises a Wallace tree adder circuit.

18. The circuit of claim 16, wherein the control word is equal to negative one.

19. The circuit of claim 16, further comprising a memory coupled to the scoring circuit, wherein the memory stores the pixel intensity values of the current and reference blocks.

20. The circuit of claim 19, further comprising:

a shifter circuit coupled between the memory and the scoring circuit; and a delay circuit coupled between the shifter circuit and the scoring circuit.

21. A method of comparing pixel intensity values of pixels in a current block to pixel intensity values of pixels in a reference block, said method comprising the steps of:

thresholding the pixel intensity values of the pixels in the current block and the reference block, thereby creating a thresholded current block and a thresholded reference block which comprise reduced precision pixel intensity values, the reduced precision pixel intensity values having a precision which is reduced with respect to the pixel intensity values of the pixels in the current block and the reference block;

comparing the reduced precision pixel intensity values of pixels in the thresholded current and reference blocks to create a current score;

comparing the current score to a previously determined best score;

replacing the best score with the current score and resetting a count if the current score is less than the best score; and retaining the best score and incrementing the count if the current score is greater than the best score.

22. The method of claim 21, wherein the step of comparing the reduced precision pixel intensity values comprises the step of calculating a current score equal to the sum of absolute differences between corresponding reduced precision pixel intensity values in the thresholded current and reference blocks, wherein the current score is represented by a carry byte and a save byte.

23. The method of claim 22, wherein the step of comparing the current score to the previously determined best score comprises the steps of:

concatenating the carry byte with a plurality of zero bits, thereby creating a carry word having a most significant byte equal to the carry byte and a least significant byte equal to zero;

concatenating the save byte with a plurality of zero bits, thereby creating a save word having a most significant byte equal to the save byte and a least significant byte equal to zero; and subtracting the carry word and the save word from the best score to create a difference.

24. The method of claim 23, wherein the replacing step comprises the steps of subtracting the difference from the best score.

25. The method of claim 23, wherein the retaining step comprises the step of incrementing the best score by one.

26. The method of claim 21, wherein the best score has an upper byte corresponding to a previously determined current score and a lower byte corresponding to the count.

* * * * *